(12) United States Patent
Inbar et al.

(10) Patent No.: US 10,359,955 B2
(45) Date of Patent: Jul. 23, 2019

(54) DATA STORAGE DEVICE CONFIGURED TO PERFORM A NON-BLOCKING CONTROL UPDATE OPERATION

(71) Applicant: WESTERN DIGITAL TECHNOLOGIES, INC., San Jose, CA (US)

(72) Inventors: Karin Inbar, Ramat-Hasharon (IL); Michael Ionin, Rehovot (IL); Einat Zevulun, Kfar-Sava (IL); Einat Lev, Rehovot (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 67 days.

(21) Appl. No.: 15/615,368

(22) Filed: Jun. 6, 2017

(65) Prior Publication Data

US 2018/0239547 A1    Aug. 23, 2018

Related U.S. Application Data

(63) Continuation-in-part of application No. 15/440,505, filed on Feb. 23, 2017.

(51) Int. Cl.
*G06F 12/02* (2006.01)
*G06F 3/06* (2006.01)
*G06F 11/14* (2006.01)

(52) U.S. Cl.
CPC ............ *G06F 3/0619* (2013.01); *G06F 3/061* (2013.01); *G06F 3/0613* (2013.01);
(Continued)

(58) Field of Classification Search
None
See application file for complete search history.

(56) References Cited

U.S. PATENT DOCUMENTS 6,526,477 B1    2/2003   Yuan et al.
7,366,826 B2    4/2008   Gorobets et al.
(Continued)

OTHER PUBLICATIONS

Hahn et al., "Data Relocation," U.S. Appl. No. 15/229,252, filed Aug. 5, 2016, 59 pages.
(Continued)

*Primary Examiner* — Kaushikkumar M Patel
(74) *Attorney, Agent, or Firm* — Patterson & Sheridan, LLP; Steven Versteeg

(57) ABSTRACT

An apparatus includes a non-volatile memory and a controller coupled to the non-volatile memory. The controller includes a volatile memory configured to store a first copy of a control table associated with the non-volatile memory. The controller is configured to perform a first update of a portion of the first copy of the control table in response to a first request, to initiate a second update of a second copy of the control table at the non-volatile memory based on the first update, and to execute a second request for access to the non-volatile memory concurrently with of the second update. The controller is configured to perform non-blocking control sync operations and non-blocking consolidation operations asynchronously, wherein non-blocking consolidation operations are atomic operations that include concurrent evacuation and compaction of an update layer to a cached address translation table in the volatile memory.

20 Claims, 14 Drawing Sheets

(52) U.S. Cl.
CPC .......... *G06F 3/0646* (2013.01); *G06F 3/0658* (2013.01); *G06F 3/0679* (2013.01); *G06F 11/14* (2013.01); *G06F 12/0246* (2013.01)

(56) References Cited

U.S. PATENT DOCUMENTS

| | | | |
|---|---|---|---|
| 7,386,655 B2 | 6/2008 | Gorobets et al. | |
| 7,865,658 B2 | 1/2011 | Lasser et al. | |
| 8,244,958 B2 | 8/2012 | Lasser | |
| 8,473,963 B2 | 6/2013 | Kottapalli et al. | |
| 8,904,118 B2 | 12/2014 | Mamidala et al. | |
| 8,966,176 B2 | 2/2015 | Duzly et al. | |
| 9,047,178 B2 | 6/2015 | Talagala et al. | |
| 9,116,791 B2 * | 8/2015 | Agami | G06F 3/0616 |
| 9,317,366 B2 | 4/2016 | Wang | |
| 2012/0054419 A1 * | 3/2012 | Chen | G06F 11/1441 |
| | | | 711/103 |
| 2014/0281122 A1 * | 9/2014 | Lieber | G06F 12/0246 |
| | | | 711/103 |
| 2014/0379991 A1 * | 12/2014 | Lomet | G06F 12/0891 |
| | | | 711/135 |
| 2016/0055084 A1 | 2/2016 | Rangaswami et al. | |
| 2016/0163392 A1 * | 6/2016 | Zhao | G11C 16/10 |
| | | | 365/185.03 |
| 2016/0299710 A1 * | 10/2016 | Chang | G06F 3/0619 |
| 2017/0075623 A1 * | 3/2017 | Oshiyama | G06F 3/0647 |
| 2017/0322735 A1 * | 11/2017 | Liu | G06F 3/0605 |
| 2018/0024920 A1 * | 1/2018 | Thomas | G06F 12/0246 |
| | | | 711/103 |
| 2018/0143886 A1 * | 5/2018 | Liu | G06F 11/1471 |

OTHER PUBLICATIONS

Inbar et al., "Block Management in Non-Volatile Memory System With Non-Blocking Control Sync System," U.S. Appl. No. 15/207,212, filed Jul. 11, 2016, 77 pages.

Frid et al., "Techniques for Non-Blocking Control Information and Data Synchronization by a Data Storage Device," U.S. Appl. No. 15/440,394, filed Feb. 23, 2017, 29 pages.

* cited by examiner

DATA STORAGE DEVICE CONFIGURED TO PERFORM A NON-BLOCKING CONTROL UPDATE OPERATION

CROSS-REFERENCE TO RELATED APPLICATION(S)

This application claims the benefit of and is a continuation-in-part of U.S. patent application Ser. No. 15/440,505, filed Feb. 23, 2017, the entire contents of which are incorporated herein by reference.

FIELD OF THE DISCLOSURE

This disclosure is generally related to electronic devices and more particularly to data storage devices.

BACKGROUND

Data storage devices enable users to store and retrieve data. Examples of data storage devices include volatile memory devices and non-volatile memory devices. A non-volatile memory device retains data after a power-down event, and a volatile memory device loses data after a power-down event.

A data storage device may store control information associated with data. For example, a data storage device may maintain a management table that indicates a mapping of logical addresses to physical addresses. In some implementations, a management table is maintained in a volatile memory of a controller of a data storage device. The data storage device may update the management table at the volatile memory and may periodically send the management table to a non-volatile memory of the data storage device (e.g., to "back up" the management table at the non-volatile memory using a control update operation).

A data storage device may "block" write operations to a non-volatile memory during a control update operation to create coherency between control tables and host data. For example, the data storage device may wait until completing one or more write operations (e.g., during a system idle time) to update the control information. During updating of the control information, the data storage device may "block" (e.g., delay) a subsequent request for write access to the non-volatile memory until updating of the control information is complete. "Blocking" one or more write operations may cause latency at a data storage device.

DETAILED DESCRIPTION

A data storage device in accordance with certain aspects of the disclosure is configured to perform a non-blocking consolidation operation that propagates (e.g., merges or consolidates) changes to a first copy of control information stored in a volatile memory to a second copy of the control information stored at a non-volatile memory. For example, instead of "blocking" operations during a consolidation operation that updates the control information, the data storage device may perform the operations concurrently, such as by performing a write operation and a consolidation operation concurrently.

In some cases, an ungraceful shutdown (UGSD) event may occur after performing the write operation and prior to updating the control information via a control sync operation. For example, a power failure may cause an UGSD event. In this case, the data storage device may perform a memory scan to identify results of the write operation (e.g., since the second copy of the control information has not been updated to reflect the results of the write operation, and the first copy of the control information may be lost from the volatile memory during the UGSD event). For example, the data storage device may use metadata (e.g., header information) of data stored at the non-volatile memory to identify results of the write operation, such as by identifying addresses modified since a prior control sync operation. The data storage device may update the control information based on the results. Consequently, a consolidation operation may be performed in a non-blocking manner without risk of data loss due to a UGSD event.

In the description, common or similar features may be designated by common reference numbers. As used herein, "exemplary" may indicate an example, an implementation, and/or an aspect, and should not be construed as limiting or as indicating a preference or a preferred implementation.

Figure 1:
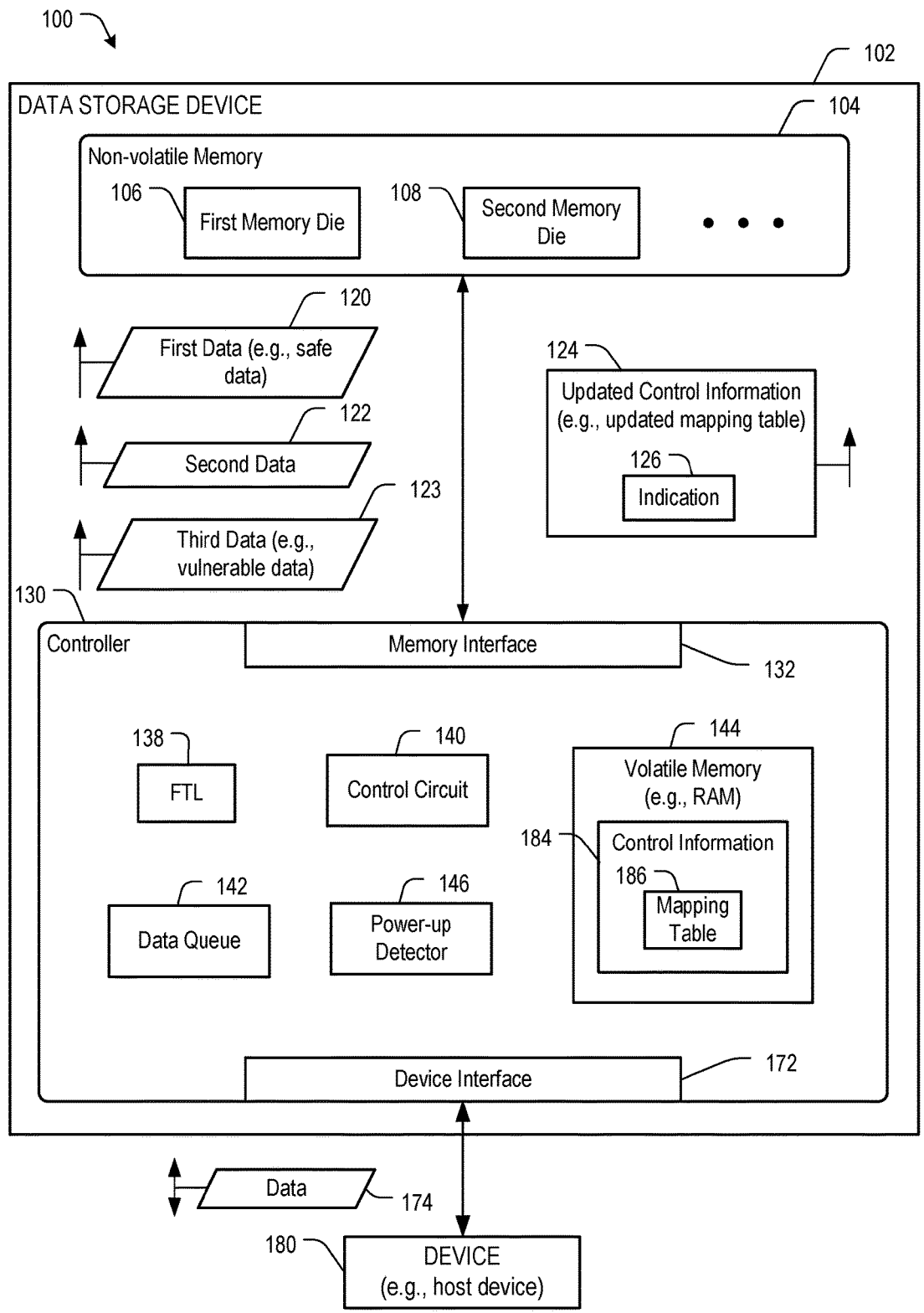
FIG. 1 is a diagram of a first illustrative example of a system that includes a data storage device configured to perform non-blocking control sync operations.

Referring to FIG. 1, a particular illustrative example of system is depicted and generally designated 100. The system 100 includes a data storage device 102 and a device 180 (e.g., a host device or an access device). The data storage device 102 includes a non-volatile memory 104 and a controller 130. The controller 130 is coupled to the non-volatile memory 104.

The non-volatile memory 104 includes a non-volatile array of storage elements included in one or more memory dies, such as a first memory die 106 and a second memory die 108. To further illustrate, the non-volatile memory 104 may include a flash memory (e.g., a NAND flash memory) or a resistive memory, such as a resistive random access memory (ReRAM), as illustrative examples. The non-volatile memory 104 may have a three-dimensional (3D) memory configuration. As used herein, a 3D memory device may include multiple physical levels of storage elements (instead of having a single physical level of storage elements, as in a planar memory device). As an example, the non-volatile memory 104 may have a 3D vertical bit line (VBL) configuration. In a particular implementation, the non-volatile memory 104 has a 3D memory array configuration that is monolithically formed in one or more physical levels of arrays of memory cells having an active area disposed above a silicon substrate. Alternatively, the non-volatile memory 104 may have another configuration, such as a two-dimensional (2D) memory configuration or a non-monolithic 3D memory configuration (e.g., a stacked die 3D memory configuration).

The non-volatile memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the non-volatile memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The controller 130 includes a memory interface 132 to the non-volatile memory 104 and further includes a device interface 172 (e.g., a host interface) to the device 180. The controller 130 may further include a flash translation layer (FTL) 138, a control circuit 140, a data queue 142, a volatile memory 144, and a power-up detector 146. The volatile memory 144 may include a random access memory (RAM), as an illustrative example.

During operation, the controller 130 may receive data 174 from the device 180, such as in connection with a request for write access to the non-volatile memory 104. The controller 130 may perform one or more operations based on the data 174 to generate first data 120, such as by encoding the data 174 to generate the first data 120. In some implementations (e.g., a flash memory implementation), the FTL 138 of the controller 130 is configured to perform a logical-to-physical address translation to translate a logical address associated with the data 174 to a physical address associated with the first data 120. The controller 130 may be configured to store (e.g., buffer or "queue") the data 174 at the data queue 142.

The memory interface 132 is configured to send the first data 120 to the non-volatile memory 104. For example, the controller 130 may retrieve the first data 120 from the data queue 142 and may provide the first data 120 to the memory interface 132 to be sent to the non-volatile memory 104. The non-volatile memory 104 may store the first data 120 to a particular region of the non-volatile memory 104 (e.g., by writing the first data 120 to the first memory die 106, to the second memory die 108, to one or more other memory dies, or a combination thereof).

The volatile memory 144 is configured to store control information 184. To illustrate, the control information 184 may include a mapping table 186, and the controller 130 may update the mapping table 186 in response to storing the first data 120 to the non-volatile memory 104, such as by updating the mapping table 186 to indicate that the non-volatile memory 104 stores the first data 120. For example, the control circuit 140 is configured to update the control information 184 to generate updated control information 124 (e.g., an updated mapping table corresponding to an updated version of the mapping table 186) based on storing of the first data 120 to the non-volatile memory 104.

The control circuit 140 may be configured to generate an indication 126 and to include the indication 126 in the updated control information 124. The indication 126 may specify data stored by the non-volatile memory 104 that has been written "safely" to the non-volatile memory 104. For example, the indication 126 may specify that the first data 120 (and other data written to the non-volatile memory 104 prior to the first data 120) corresponds to "safe" (or reliable) data. The indication 126 may specify the first data 120 using a logical address associated with the first data 120, a physical address associated with the first data 120, other information, or a combination thereof. Alternatively or in addition, the indication 126 may specify a "safe point" (or a "sync point"), such as a timestamp, where data written to the non-volatile memory 104 prior to the safe point corresponds to safe data, and where data written to the non-volatile memory 104 after the safe point corresponds to vulnerable data.

The controller 130 may send the updated control information 124 to the non-volatile memory 104 (e.g., to "back up" a copy of the updated control information 124) to enable retrieval of the updated control information 124 (e.g., to enable recovery of the updated control information 124 after a power cycle at the data storage device 102). The updated control information 124 may be sent to the non-volatile memory 104 in connection with a non-blocking control sync (CS) operation (also referred to herein as a control update operation or a control program operation).

In accordance with aspects of the disclosure, the controller 130 is configured to send the updated control information 124 to the non-volatile memory 104 concurrently with other data to be stored at the non-volatile memory 104 (e.g., without "blocking" other accesses to and processes performed by the non-volatile memory 104). In an illustrative example, the memory interface 132 is configured to concurrently send second data 122 and the updated control information 124 to be stored at the non-volatile memory 104. The data queue 142 may be configured to store the second data 122 to be written to the non-volatile memory 104. In a particular example, the controller 130 may be configured to access the second data 122 from the data queue 142 and the updated control information 124 from the volatile memory 144 and to provide the second data 122 and the updated control information 124 to the memory interface 132 concurrently. In an illustrative example, the memory interface 132 is configured to concurrently send the second data 122 to one of the first memory die 106 and the second memory die 108 and to send the updated control information 124 to the other of the first memory die 106 and the second memory die 108.

As used herein, "concurrently" sending the second data 122 and the updated control information 124 may refer to sending the second data 122 and the updated control information 124 using at least one common clock cycle, at least one common packet, or another common technique. To illustrate, the second data 122 and the updated control information 124 may be sent concurrently if at least a portion of the second data 122 and at least a portion of the updated control information 124 are sent during a common clock cycle or using a common packet. In some cases, the memory interface 132 may include a multi-channel bus that is coupled to the non-volatile memory 104, and the second data 122 and the updated control information 124 may be concurrently sent to the non-volatile memory 104 using the multi-channel bus.

The non-volatile memory 104 is configured to store the second data 122 and the updated control information 124 in a non-blocking manner. For example, the non-volatile memory 104 may perform a non-blocking CS operation that writes the updated control information 124 to the non-volatile memory 104 without "blocking" writing of the second data 122.

Data that is written to the non-volatile memory 104 after writing of the updated control information 124 may correspond to vulnerable data. To illustrate, the memory interface 132 may be configured to send third data 123 to the non-volatile memory 104 after sending the updated control information 124. The indication 126 may specify that the third data 123 corresponds to vulnerable data. For example, if a power-off event occurs during or after writing of the updated control information 124 to the non-volatile memory 104 and prior to re-updating the control information 184 based on writing of the third data 123, the controller 130 may be unable to determine whether the third data 123 has been programmed successfully (e.g., resulting in "lost" data). Accordingly, the third data 123 may correspond to "vulnerable" data.

Depending on the particular implementation, data that is written to the non-volatile memory 104 concurrently with writing of the updated control information 124 may correspond to "safe" data or to "vulnerable" data. In an illustrative example, the control circuit 140 is configured to access the second data 122 in the data queue 142 during generation of the updated control information 124. In this example, the control circuit 140 may be configured to cause the indication 126 to specify that the second data 122 corresponds to safe data (because the second data 122 is to be programmed concurrently with the updated control information 124). In other implementations, the second data 122 may correspond to vulnerable data.

To further illustrate, the power-up detector 146 may be configured to detect a power-up event at the data storage device 102 that occurs after writing the second data 122 and the updated control information 124 to the non-volatile memory 104. The controller 130 may be configured to perform a scan operation using the updated control information 124 (e.g., using the indication 126) in response to the power-up event to identify the third data 123.

In a particular example of an implicit technique, the indication 126 may implicitly specify that the third data 123 is vulnerable. For example, the indication 126 may indicate that the first data 120 was stored to the non-volatile memory 104 prior to generating the updated control information 124 and that data stored after the first data 120 is vulnerable. The controller 130 may read the first data 120 from the non-volatile memory 104 to determine a particular timestamp associated with the first data 120 and may scan the non-volatile memory 104 for data (e.g., the third data 123) indicating timestamps after the particular timestamp associated with the first data 120.

Depending on the particular implementation, the data storage device 102 may perform one or more operations in response to detecting vulnerable data, such as the second data 122. As an illustrative example, the data storage device 102 may notify the device 180 that the second data 122 is vulnerable due to a power-off event at the data storage device 102.

Operation at the data storage device 102 may continue with one or more memory operations. For example, the data storage device 102 may perform a write operation to write fourth data to the non-volatile memory 104. The data storage device 102 may update the control information 184 to generate a third version of the control information 184 based on programming the fourth data, and the data storage device 102 may concurrently send the third version of the control information 184 and fifth data to be stored at the non-volatile memory 104. The third version of the control information 184 may specify that the fourth data (or the fourth data and the fifth data) corresponds to safe data.

One or more aspects described with reference to FIG. 1 may improve performance at the data storage device 102. For example, the data storage device 102 may perform a CS operation without "blocking" other memory accesses to and processes performed by the non-volatile memory 104 during the non-blocking CS operation, such as by concurrently writing the second data 122 and the updated control information 124 to the non-volatile memory 104. As a result, throughput may be improved as compared to a device that "blocks" memory access operations while storing updated control information.

Figure 2:
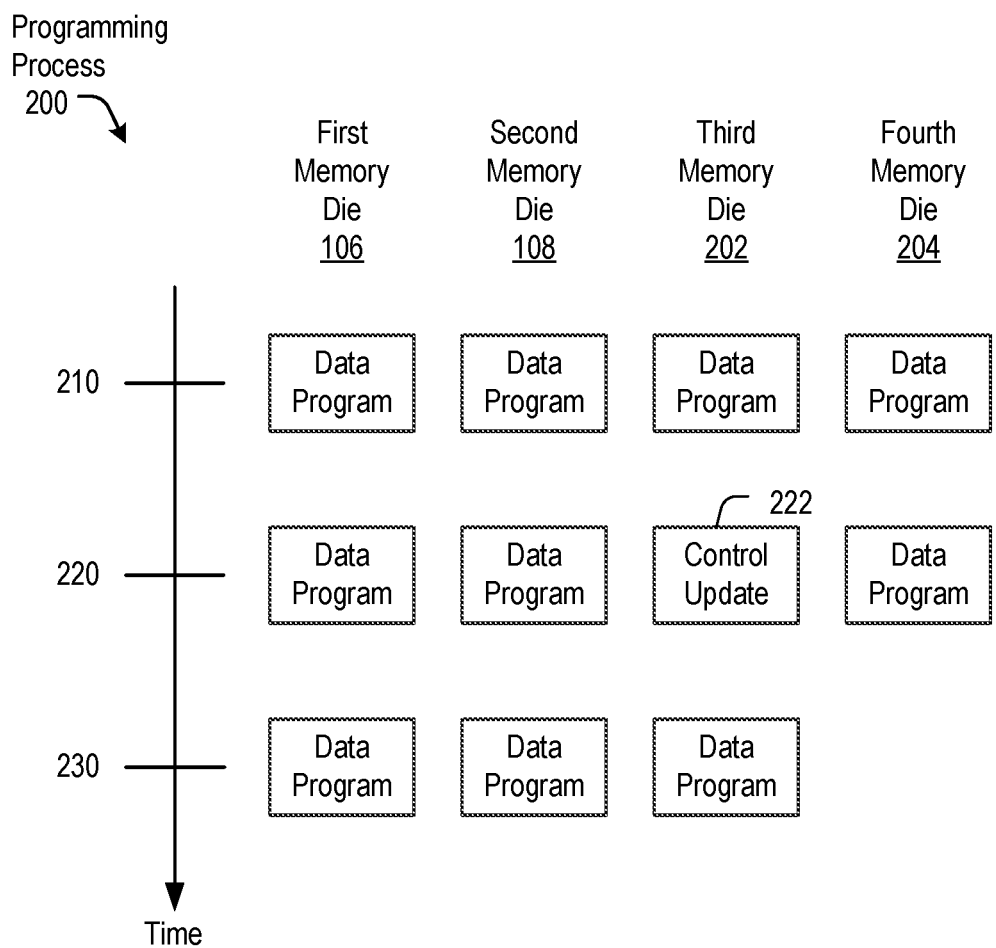
FIG. 2 depicts an illustrative example of a programming process that may be performed at the data storage device of FIG. 1.

Referring to FIG. 2, a particular illustrative example of a programming process is depicted and generally designated 200. The programming process 200 may be performed by the data storage device 102 of FIG. 1. For example, the programming process 200 may be performed using the first memory die 106 and the second memory die 108 of FIG. 1. FIG. 2 also depicts that the programming process 200 may be performed using a third memory die 202 and a fourth memory die 204. The third memory die 202 and the fourth memory die 204 may be included in the non-volatile memory 104 of FIG. 1.

FIG. 2 depicts a first set of data program operations, at 210. For example, data may be programmed to one or more of the memory dies 106, 108, 202, and 204. The data may include the first data 120 of FIG. 1, as an illustrative example.

The programming process 200 further includes concurrently performing a control program operation 222 and one or more data program operations, at 220. For example, FIG. 2 depicts that data program operations may be performed at the first memory die 106, the second memory die 108, and the fourth memory die 204. The data may include the second data 122 of FIG. 1, as an illustrative example. FIG. 2 also depicts that the third memory die 202 may perform the control program operation 222. For example, performing the control program operation 222 may include programming the updated control information 124 of FIG. 1 to the third memory die 202 concurrently with writing of the second data 122 of FIG. 1.

FIG. 2 also shows that a third set of one or more data program operations may be performed, at 230. To illustrate, the first memory die 106, the second memory die 108, and the third memory die 202 may perform data program operations. In an illustrative example, data programmed prior to the control program operation 222 may correspond to safe data. For example, the data programmed at 210 may correspond to safe data, and the indication 126 of FIG. 1 may specify that the data programmed at 210 corresponds to safe data. Data programmed concurrently or after the control program operation 222 may correspond to vulnerable data. For example, data programmed at 230 may correspond to vulnerable data, and the indication 126 of FIG. 1 may specify that the data programmed at 230 corresponds to vulnerable data. Depending on the particular implementation, data programmed concurrently with the control program operation 222 may include safe data or vulnerable data. For example, data programmed at 220 may correspond to either safe data or vulnerable data, and the indication 126 of FIG. 1 may specify that the data programmed at 220 corresponds to either safe data or vulnerable data.

One or more aspects described with reference to FIG. 2 may improve performance at a data storage device, such as the data storage device 102 of FIG. 1. For example, by concurrently performing the control program operation 222 and one or more data program operations, throughput is improved as compared to a device that "blocks" data write operations while storing updated control information.

Figure 3:
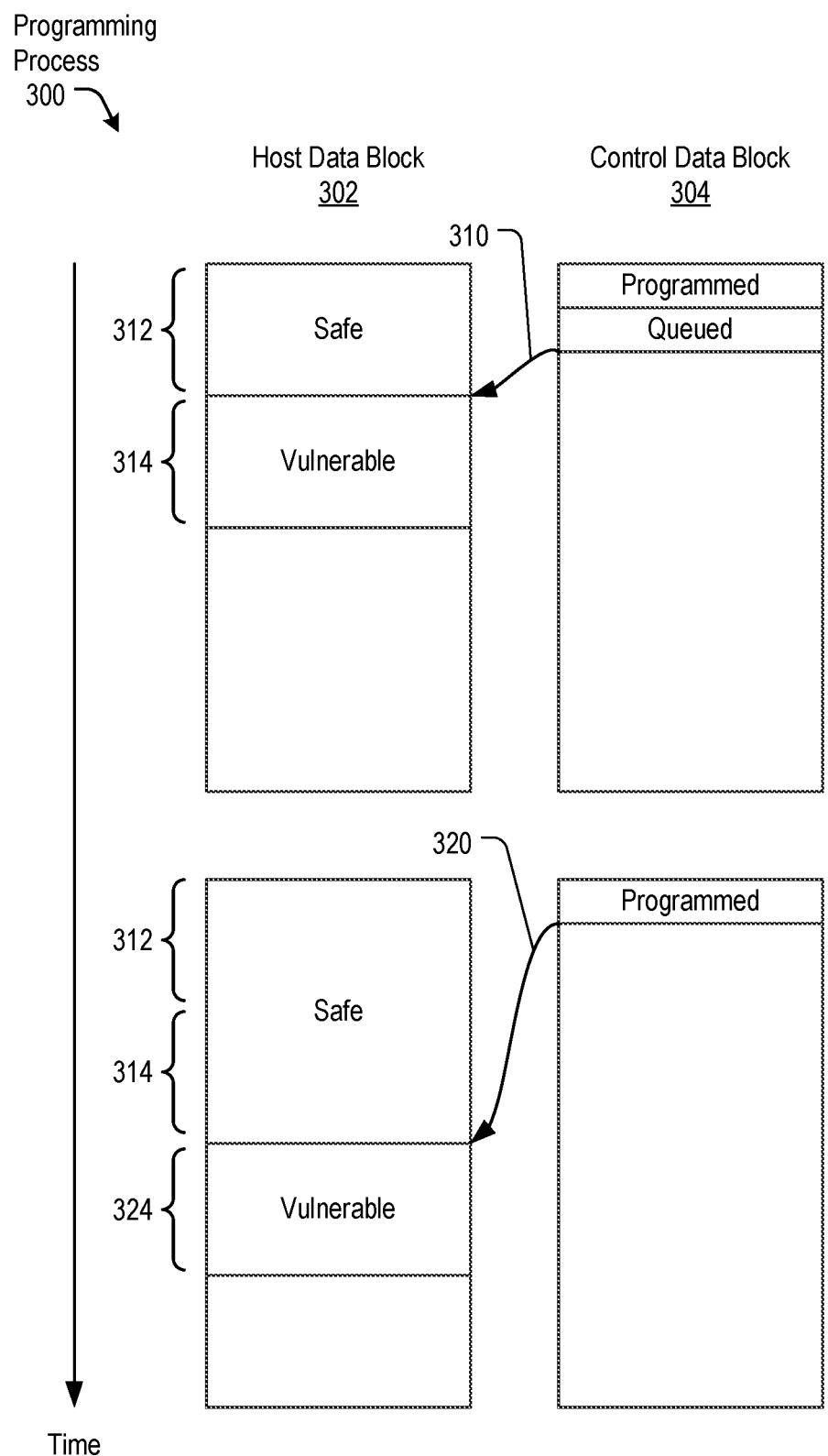
FIG. 3 depicts another illustrative example of a programming process that may be performed at the data storage device of FIG. 1.

Referring to FIG. 3, another particular illustrative example of a programming process is depicted and generally designated 300. The programming process 300 depicts operations associated with a host data block 302 and a control data block 304. For example, the host data block 302 may correspond to a region (e.g., a physical region, a logical region, or a virtual region) of the non-volatile memory 104, and the control data block 304 may correspond to another region (e.g., a physical region, a logical region, or a virtual region) of the non-volatile memory 104.

The programming process 300 may include performing a first control update, at 310. The first control update may include storing the updated control information 124 to the non-volatile memory 104 of FIG. 1. The control update may correspond to the control update operation 222 of FIG. 2. The updated control information 124 may include the indication 126, and the indication 126 may specify that data programmed prior to performing the first control update includes safe data 312. The indication 126 may further specify that data programmed after performing the first control update may include vulnerable data 314.

The programming process 300 further includes performing a second control update, at 320. The second control update may include storing a re-updated version of the control information 184 of FIG. 1 to the non-volatile memory 104 of FIG. 1. By re-updating the control information 184, the re-updated control information may include an indication that data programmed to the non-volatile memory 104 prior to re-updating the control information 184 corresponds to safe data. For example, the vulnerable data 314 may be reclassified as safe data. Further, data programmed after the second control update may be indicated as being vulnerable. For example, data 324 programmed after the second control update may be indicated as being vulnerable.

FIG. 3 illustrates that control update operations may be used to indicate safe data, vulnerable data, or both. The control update operations may "re-classify" data previously indicated as being vulnerable.

Figure 4:
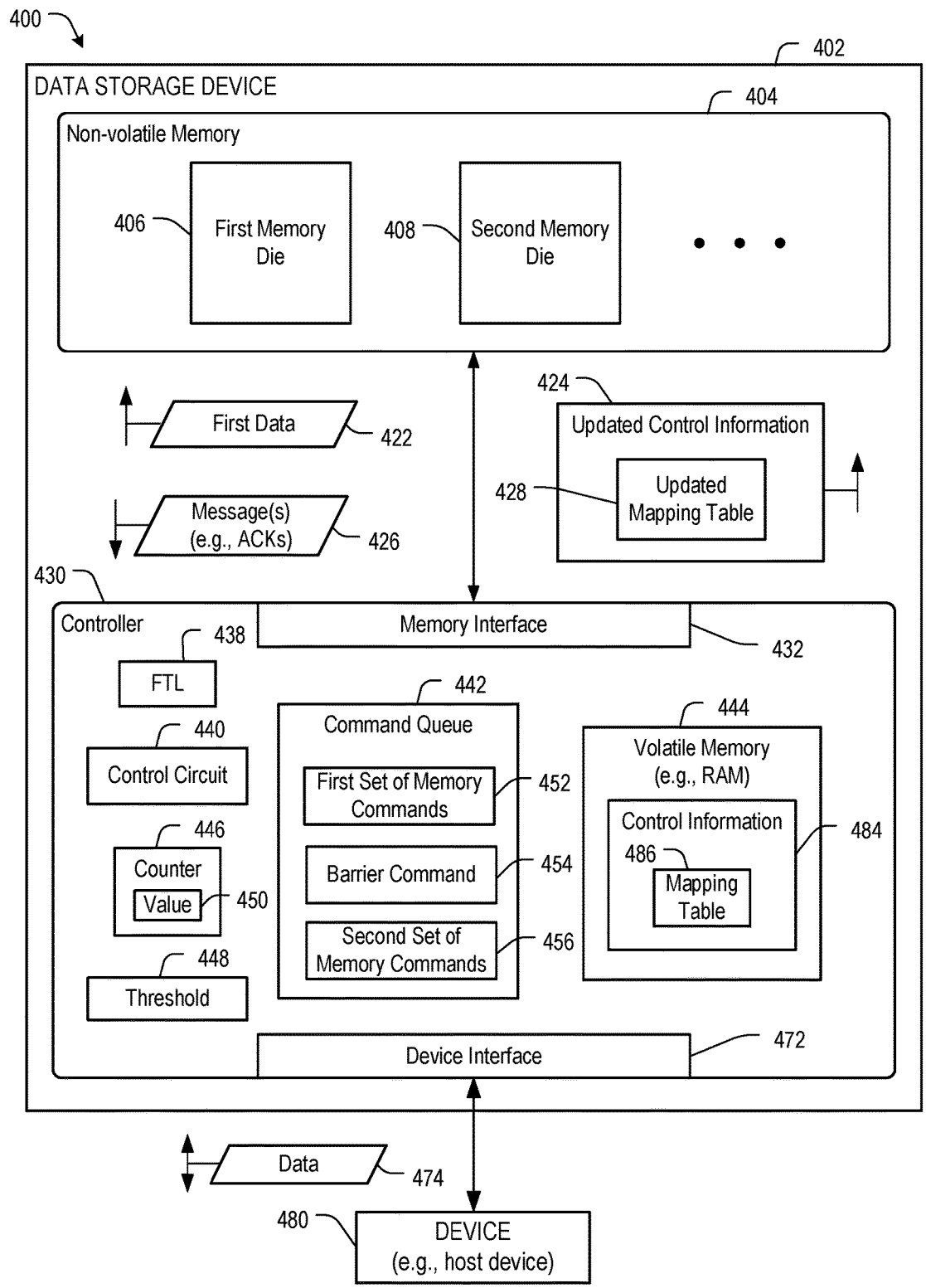
FIG. 4 is a diagram of a second illustrative example of a system that includes a data storage device configured to perform non-blocking control sync operations.

Referring to FIG. 4, a particular illustrative example of system is depicted and generally designated 400. The system 400 includes a data storage device 402 and a device 480 (e.g., a host device or an access device). The data storage device 402 includes a non-volatile memory 404 and a controller 430. The controller 430 is coupled to the non-volatile memory 404.

The non-volatile memory 404 includes a non-volatile array of storage elements included in one or more memory dies, such as a first memory die 406 and a second memory die 408. In an illustrative example, the first memory die 406 and the second memory die 408 correspond to the first memory die 106 and the second memory die 108 of FIG. 1.

The controller 430 includes a memory interface 432 to the non-volatile memory 404 and further includes a device interface 472 (e.g., a host interface) to the device 480. The controller 430 may further include a flash translation layer (FTL) 438, a control circuit 440, a command queue 442, a volatile memory 444, and a counter 446. The volatile memory 444 may include a random access memory (RAM), as an illustrative example.

During operation, the controller 430 may receive data 474 from the device 480, such as in connection with a request for write access to the non-volatile memory 404. The controller 430 may perform one or more operations based on the data 474 to generate first data 422, such as by encoding the data 474 to generate the first data 422. In some implementations (e.g., a flash memory implementation), the FTL 438 of the controller 430 is configured to perform a logical-to-physical address translation to translate a logical address associated with the data 474 to a physical address associated with the first data 422.

To initiate storing of the first data 422 to the non-volatile memory 404, the controller 430 is configured to queue one or more memory commands at the command queue 442. For example, the controller 430 may be configured to queue a first set of memory commands 452 at the command queue 442 to initiate storing of the first data 422 at the non-volatile memory 404. Depending on the particular example, the first set of memory commands 452 may target one or memory dies of the non-volatile memory 404, such as the first memory die 406, the second memory die 408, one or more other memory dies, or a combination thereof.

The volatile memory 444 is configured to store control information 484. To illustrate, the control information 484 may include a mapping table 486, and the controller 430 may update the mapping table 486 to generate an updated mapping table 428 in response to storing data to the non-volatile memory 404, such as by updating the mapping table 486 to indicate that the non-volatile memory 404 stores the first data 422. The control circuit 440 may be configured to generate the updated control information 424 based on storing of the first data 422 to the non-volatile memory 404.

To preserve integrity of the updated control information 424 (e.g., after a power cycle at the data storage device 402), the controller 430 may send the updated control information 424 to the non-volatile memory 404 (e.g., to "back up" a copy of the updated control information 424). The updated control information 424 may be sent to the non-volatile memory 404 in connection with a non-blocking control sync (CS) operation (also referred to herein as a control update operation).

In accordance with aspects of the disclosure, the controller 430 may be configured to provide a barrier command 454 to the command queue 442 following the first set of memory commands 452. The barrier command 454 may enable the first set of memory commands 452 to be executed prior to sending the updated control information 424 to be stored at the one or more memory dies. For example, if the controller 430 issues the barrier command 454 to both the memory dies 406, 408, the controller 430 may receive completion acknowledgements (ACKs) from the memory dies 406, 408 upon execution of the barrier command 454 by the memory dies 406, 408. In this case, the completion ACKs may indicate that the memory dies 406, 408 have executed the first set of memory commands 452. As a result, the controller 430 may store the updated control information 424 in response to determining (based on the completion ACKs) that the first set of memory commands 452 has been completed (and that the updated control information 424 accurately represents a state of the non-volatile memory 404). In an illustrative example, the memory dies 406 and 408 are configured to continue processing of commands from the command queue 442 with little or no delay immediately after execution of the barrier command 454. In this example, the control sync operation is a non-blocking operation.

To further illustrate, the controller 430 may initiate execution of the first set of memory commands 452 by providing the first set of memory commands 452 to the non-volatile memory 404. The controller 430 may provide the barrier command 454 to the non-volatile memory 404 after providing the first set of memory commands 452 to the non-volatile memory 404. Memory commands of the first set of memory commands 452 may be provided to the first memory die 406, to the second memory die 408, to one or more other memory dies of the non-volatile memory 404, or a combination thereof.

Upon executing one or more memory commands of the first set of memory commands 452, a memory die of the non-volatile memory 404 may execute the barrier command 454. In response to executing the barrier command 454, a memory die of the non-volatile memory 404 may provide a message (e.g., a completion ACK) to the controller 430. To illustrate, FIG. 4 depicts that the controller 430 may receive one or more messages 426 from the non-volatile memory 404. The one or more messages 426 are associated with the barrier command 454 and may include completion ACKs from one or more of the memory dies 406, 408. For example, in response to the first memory die 406 executing the barrier command 454, the first memory die 406 may provide a first message of the one or more messages 426 to the controller 430. As another example, in response to the second memory die 408 executing the barrier command 454, the second memory die 408 may provide a second message of the one or more messages 426 to the controller 430.

The controller 430 may be configured to adjust a value 450 indicated by the counter 446 in response to receiving each of the one or more messages 426. Depending on the particular example, the controller 430 may receive the one or more messages 426 concurrently or sequentially. As an illustrative example, the controller 430 may receive the one or more messages 426 sequentially based on different workloads and write speeds of the memory dies 406, 408.

The controller 430 is configured to determine whether a condition associated with the barrier command 454 is satisfied, such as whether a number of the one or more messages 426 satisfies a threshold 448. In an illustrative example, the threshold 448 corresponds to a number of memory dies of the non-volatile memory 104 that are to execute the barrier command 454. In this example, the threshold 448 may correspond to a number of "expected" completion ACKs to be received from the non-volatile memory 404 (based on the number of memory dies of the non-volatile memory 404 that receive the barrier command 454). The controller 430 may monitor a number of received completion ACKs using the value 450 (e.g., by incrementing the value 450 in response to each received completion ACK).

The controller 430 may be configured to compare the value 450 to the threshold 448 to determine whether the number satisfies (e.g., is greater than or is greater than or equal to) the threshold 448. As an illustrative example, the control circuit 440 may include a comparator circuit coupled to the counter 446. The comparator circuit may be configured to compare the value 450 to the threshold 448 to determine whether the number satisfies the threshold 448.

If the number fails to satisfy the threshold 448, the controller 430 may determine that the condition is unsatisfied. As a result, the controller 430 may wait to receive at least one other message of the one or more messages 426. As an illustrative example, if the barrier command 454 is provided to both the memory dies 406, 408, then the threshold 448 may correspond to two, and a number equal to zero or to one fails to satisfy the threshold 448.

Alternatively, if the number of the one or more messages 426 satisfies the threshold 448, the controller 430 may determine that the condition associated with the barrier command 454 is satisfied. To illustrate, if the barrier command 454 is provided to both the memory dies 406, 408, then the threshold 448 may correspond to two, and a number equal to two satisfies the threshold 448. In this example, the controller 430 may determine that each the first set of memory commands 452 has been executed and that the updated control information 424 accurately reflects a state of the non-volatile memory 404 (due to execution of the first set of memory commands 452). In this case, the controller 430 is configured to send the updated control information 424 to be stored at the non-volatile memory 404 in response to the number of the one or more messages 426 satisfying the threshold 448.

The barrier command 454 may be referred to as a "control sync mark." The barrier command 454 follows the first set of memory commands 452, and completion of execution of the barrier command ensures that the first set of memory commands 452 is executed prior to writing the updated control information 424. The second set of memory commands 456 may be provided to the non-volatile memory 404 in parallel with the barrier command 454 (e.g., so that execution of a CS operation does not "block" write commands to the non-volatile memory 404).

In connection with the example of FIG. 4, a CS operation is performed by the data storage device 402 in a non-blocking manner. For example, one or more memory access operations may be performed concurrently with sending of the updated control information 424 to the non-volatile memory 404. To further illustrate, in some implementations, one or more memory commands of the second set of memory commands 456 may be sent to the non-volatile memory 404 concurrently with sending of the updated control information 424, such as by using a multi-channel bus that may be included in the memory interface 432.

One or more aspects described with reference to FIG. 4 may improve performance at the data storage device 402. For example, the data storage device 402 is configured to perform a CS operation without "blocking" other memory access operations during the non-blocking CS operation. As a result, throughput may be improved as compared to a device that "blocks" memory access operations while storing updated control information.

Figure 5:
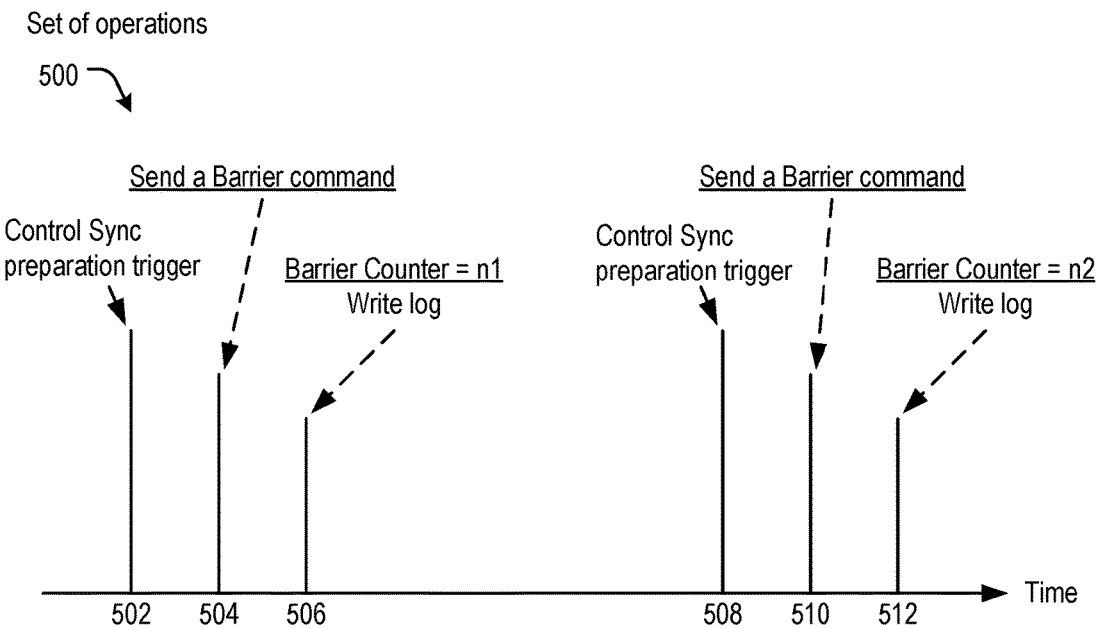
FIG. 5 depicts a set of operations that may be performed by the data storage device of FIG. 4.

Referring to FIG. 5, illustrative aspects of a set of operations are depicted and generally designated 500. The set of operations 500 may be performed at the data storage device 402 of FIG. 4, as an illustrative example.

The set of operations 500 may include detecting a trigger event, at 502. The trigger event may correspond to a condition that indicates the control information 484 is to be updated and stored at the non-volatile memory 404. For example, the trigger condition may correspond to a particular number of operations at the non-volatile memory 404, a threshold time duration since previously updating and storing the control information 484, one or more other conditions, or a combination thereof.

The set of operations 500 further include sending a barrier command, at 504. For example, the controller 430 may send the barrier command 454 to the non-volatile memory 404.

The set of operations 500 further includes writing a log, at 506. For example, the log may include the updated control information 424, and the log may be written to the non-volatile memory 404. The log may be written to the non-volatile memory 404 in response to determining that a number of the one or more messages 426 satisfies the threshold 448.

The set of operations 500 further includes detecting a trigger event, at 508. For example, the trigger event may be detected in response to performing a particular number of operations at the non-volatile memory 404, a threshold time duration since previously updating and storing the control information 484 (e.g., at 506), one or more other conditions, or a combination thereof.

The set of operations 500 further includes sending a barrier command, at 510. For example, another barrier command corresponding to the barrier command 454 may be provided by the controller 430 to the non-volatile memory 404, such as in connection with re-updating the control information 484.

The set of operations 500 further includes writing a log, at 512. For example, the control information 484 may be re-updated based on one or more memory operations performed at the non-volatile memory 404, and the re-updated control information may be provided to the non-volatile memory 404.

The example of FIG. 5 illustrates that a barrier command (e.g., the barrier command 454) may be used in connection with writing a log, such as the non-volatile memory 404. The barrier command may ensure that previous memory commands are executed before the barrier command and that subsequent memory commands are executed after the barrier command, maintaining coherence of the log with respect to the memory commands.

Figure 6:
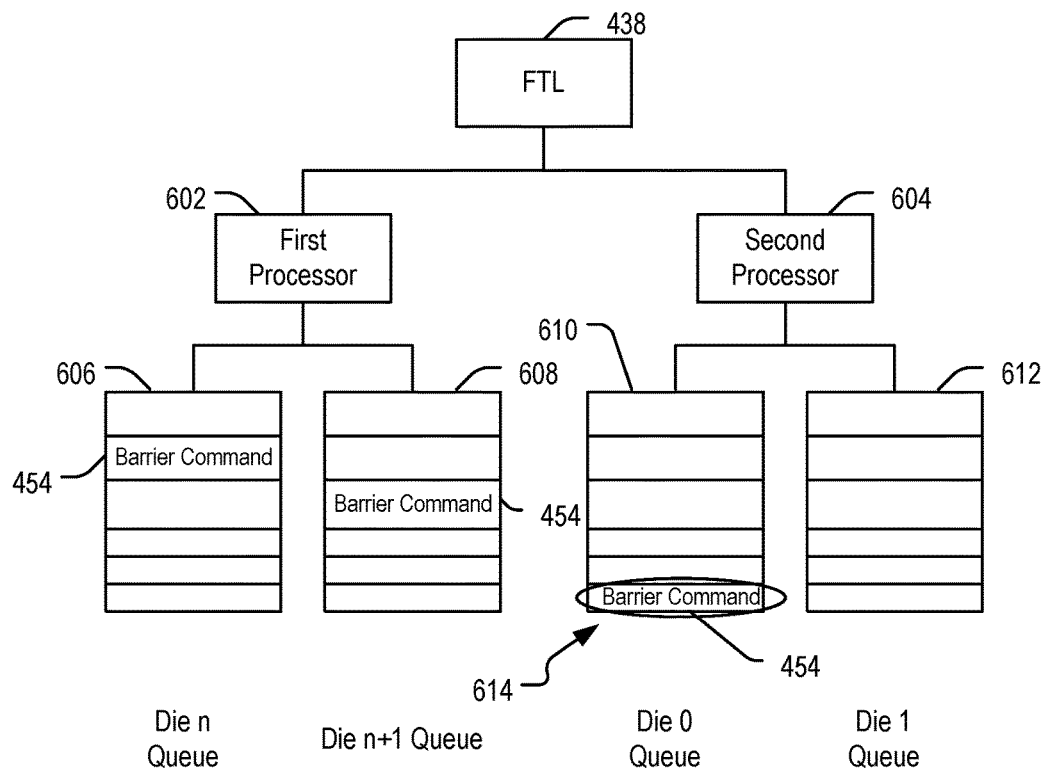
FIG. 6 is a diagram depicting certain illustrative aspects of an example of the data storage device of FIG. 4.

FIG. 6 depicts illustrative aspects of the data storage device 402 of FIG. 4. In FIG. 6, operations are described with reference to the FTL 438 of FIG. 4, a first processor 602, and a second processor 604. Operations are also described with reference to a command queue 606, a command queue 608, a command queue 610, and a command queue 612.

During operation, the processors 602, 604 may be responsive to the FTL 438. For example, the FTL 438 may provide an indication to the processors 602, 604 to generate a barrier command, such as the barrier command 454. In the example of FIG. 6, each of the command queues 606, 608, 610, and 612 may be associated with a particular memory die of the non-volatile memory 404. As an illustrative example, the command queue 606 may be associated with a memory die n (e.g., the first memory die 406), and the command queue 608 may be associated with a memory die n+1 (e.g., the second memory die 408), where n is a positive integer. The command queue 610 may be associated with a memory die 0, and the command queue 612 may be associated with a memory die 1.

During execution of commands, barrier command 454 may propagate through each of the command queues 608, 608, 610, and 612 (e.g., by "moving up in the queue" in response to execution of a preceding instruction). Due to different die characteristics, such as different die workloads or different die write speeds, certain memory dies of the non-volatile memory 404 may reach the barrier command 454 prior to other memory dies of the non-volatile memory 404. For example, in FIG. 6, the command queue 608 may indicate that the barrier command 454 is ready for execution prior to the command queue 610 indicating that the barrier command 454 is ready for execution.

Each memory die executing the barrier command 454 may provide a respective message of the one or more messages 426 to the controller 430 of FIG. 4. To illustrate, FIG. 6 depicts that a particular memory die corresponding to the command queue 610 may send a particular message, such as a die barrier response, at 614. In a particular example, sending the die barrier response at 614 causes a number of the one or more messages 426 to satisfy the threshold 448. In this example, the controller 430 may initiate sending of the updated control information 424 to the non-volatile memory 404 in response to receiving the die barrier response from each of the memory dies n, n+1, 0, and 1. In this illustrative example, the threshold 448 may correspond to four. As a result of the number of the one or more messages 426 satisfying the threshold 448, the controller 430 may detect that the updated control information 424 is to be sent to the non-volatile memory 404, maintaining coherence of the updated control information 424 with respect to memory operations performed at the non-volatile memory 404.

Figure 7:
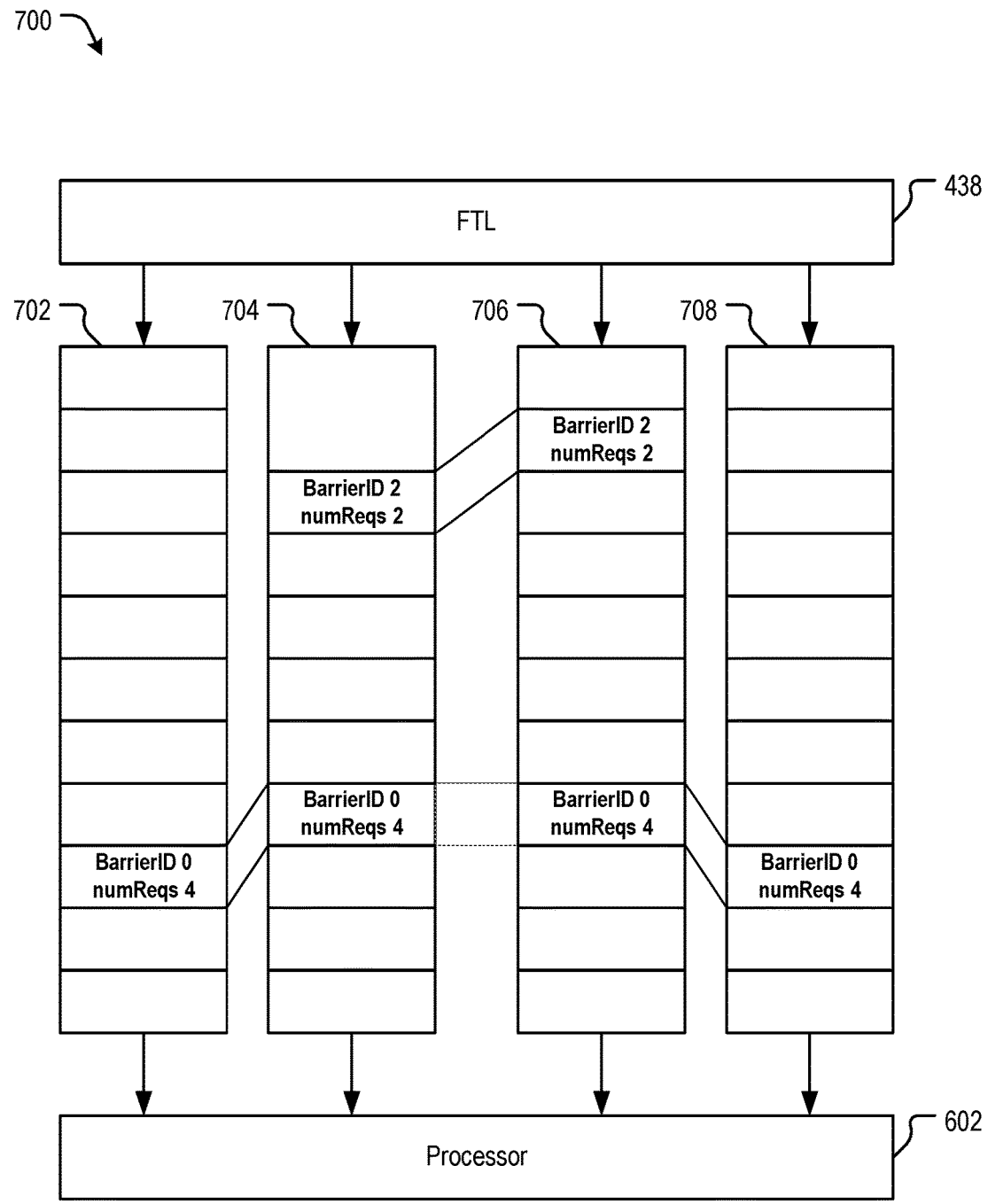
FIG. 7 is a diagram of a device that may be included in the data storage device of FIG. 4.

Referring to FIG. 7, illustrative aspects of a device are depicted and generally designated 700. One or more aspects of the device 700 of FIG. 7 may be integrated within the controller 430 of FIG. 4. For example, FIG. 7 depicts the FTL 438 of FIG. 4 and the first processor 602 of FIG. 6.

In FIG. 7, multiple queues are coupled between the FTL 438 and the processor 602. For example, FIG. 7 depicts that a queue 702, a queue 704, a queue 706, and a queue 708 may be coupled between the FTL 438 and the processor 602.

The example of FIG. 7 shows multiple barrier commands associated with different numbers of messages. To illustrate, the example of FIG. 7 depicts a first barrier command associated with a first barrier identification ("barrierID") of zero. The first barrier command is associated with a first number ("numReqs") of one or more messages that is equal to four (e.g., because the first barrier command may be provided to four memory dies in the example of FIG. 7). As another example, FIG. 7 also depicts a second barrier command that is associated with a second barrier ID of two and that is associated with a second number of one or more messages equal to two (e.g., because the second barrier command may be provided to two memory dies in the example of FIG. 7).

Any of the barrier commands of FIG. 7 may correspond to the barrier command 454 of FIG. 4, and any of the numbers of messages described with reference to FIG. 7 may correspond to the threshold 448 of FIG. 4. Each of the queues 702, 704, 706, and 708 may be associated with a corresponding die of the non-volatile memory 404.

The example of FIG. 7 illustrates that multiple barrier messages may be used, where each of the barrier messages is associated with a corresponding identification (barrierID) and a corresponding number of messages (numReqs). As a result, the controller 430 of FIG. 4 may concurrently schedule multiple operations that use barrier completion and that include one or more CS operations. Depending on the particular example, the multiple operations may include one or more flush operations, one or more dependent control operations that depend on completion of previous operations, one or more other operations, or a combination thereof.

Figure 8:
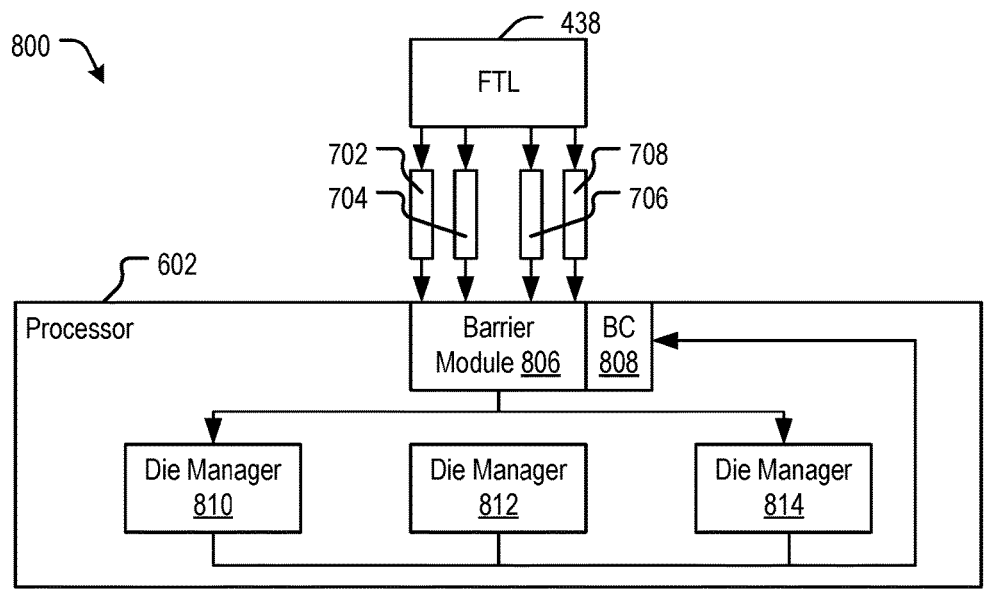
FIG. 8 is a diagram of illustrative aspects of the device of FIG. 7.

Referring to FIG. 8, illustrative aspects of the device 700 of FIG. 7 are depicted and generally designated 800. The device 800 of FIG. 8 may be included in the data storage device 402 of FIG. 4.

In the example of FIG. 8, the first processor 602 includes a barrier module 806 and a barrier counter (BC) 808. In a particular example, the barrier module 806 corresponds to the control circuit 440, and the BC 808 corresponds to the counter 446 of FIG. 4.

In the example of FIG. 8, the first processor 602 further includes a first die manager 810, a second die manager 812, and a third die manager 814. Each of the die managers 810, 812, and 814 may be associated with a corresponding memory die of the non-volatile memory 404. As an illustrative example, the first die manager 810 may manage memory operations performed at the first memory die 406, and the second die manager 812 may control memory operations at the second memory die 408 of FIG. 4.

In the example of FIG. 8, the die managers 810, 812, and 814 may be configured to receive messages from memory dies of the non-volatile memory 404. To illustrate, the first die manager 810 may be configured to receive a first message of the one or more messages 426 from the first memory die 406, and the second die manager 812 may be configured to receive a second message of the one or more messages 426 from the second memory die 408. Each of the die managers 810, 812, and 814 may be configured to increment the BC 808, and the barrier module 806 may be configured to detect when a value indicated by the BC 808 (e.g., the value 450 of the counter 446) satisfies the threshold 448.

Figure 9:
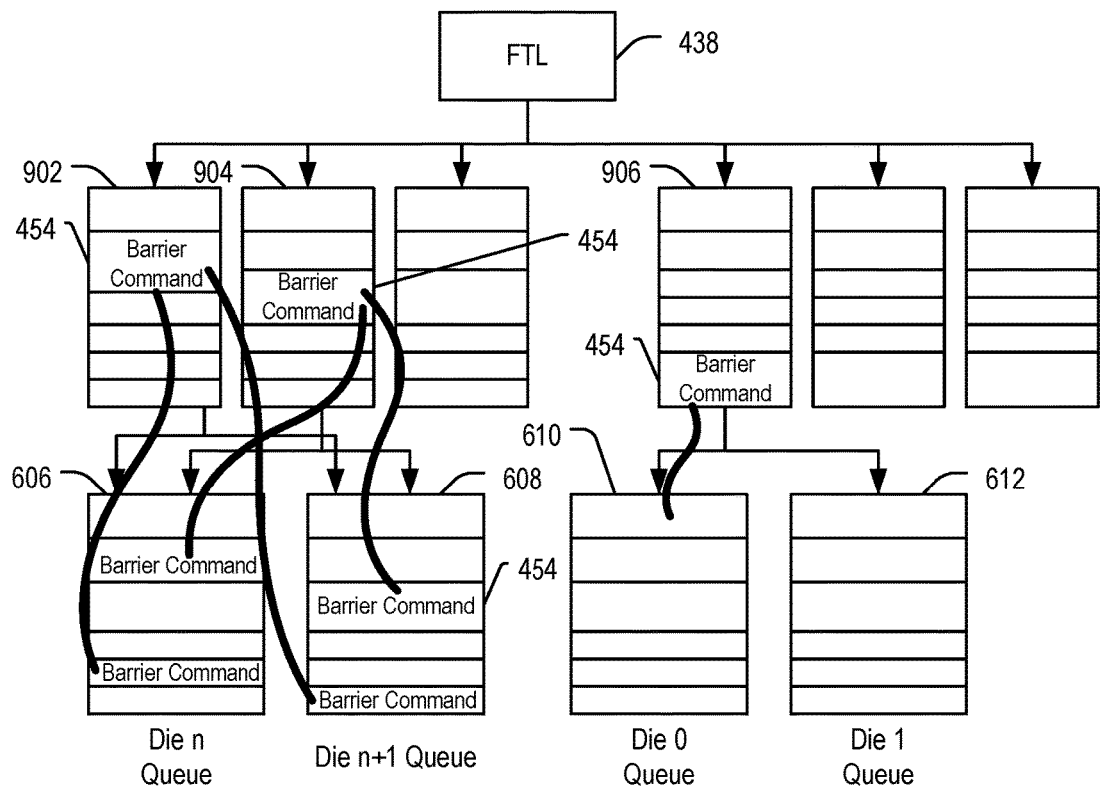
FIG. 9 is a diagram depicting additional illustrative aspects of an example of the data storage device of FIG. 4.

FIG. 9 depicts illustrative aspects of the data storage device 402 of FIG. 4. In FIG. 9, operations are described with reference to the FTL 438 of FIG. 4 and a set of queues, such as the command queues 606, 608, 610, and 612. FIG. 9 also illustrates that the set of queues may further include a queue 902, a queue 904, and a queue 906.

The set of queues of FIG. 9 may have a hierarchical configuration. For example, the queues 606, 608, 610, and 612 may correspond to a "lower" level of a hierarchy, and the queues 902, 904 may correspond to a "higher" level of the hierarchy. Each "higher" level queue may be connected to multiple "lower" level queues. For example, the queue 902 is connected to the queues 606, 608. As additional examples, the queue 904 is connected to the queues 606, 608, and the queue 906 is connected to the queues 610, 612.

In the example of FIG. 9, the FTL 438 may send a barrier command to one or more queues of the set of queues. A barrier command sent to a "higher" queue may be propagated to one or more "lower" queues. For example, FIG. 9 illustrates that the barrier command 454 may be propagated from the queue 902 to the queues 606, 608. As another example, FIG. 9 depicts that the barrier command 454 may be propagated from the queue 904 to the queues 606, 608. In response to execution of each of the barrier commands 454, a completion message may be forwarded to FTL 438.

Figure 10:
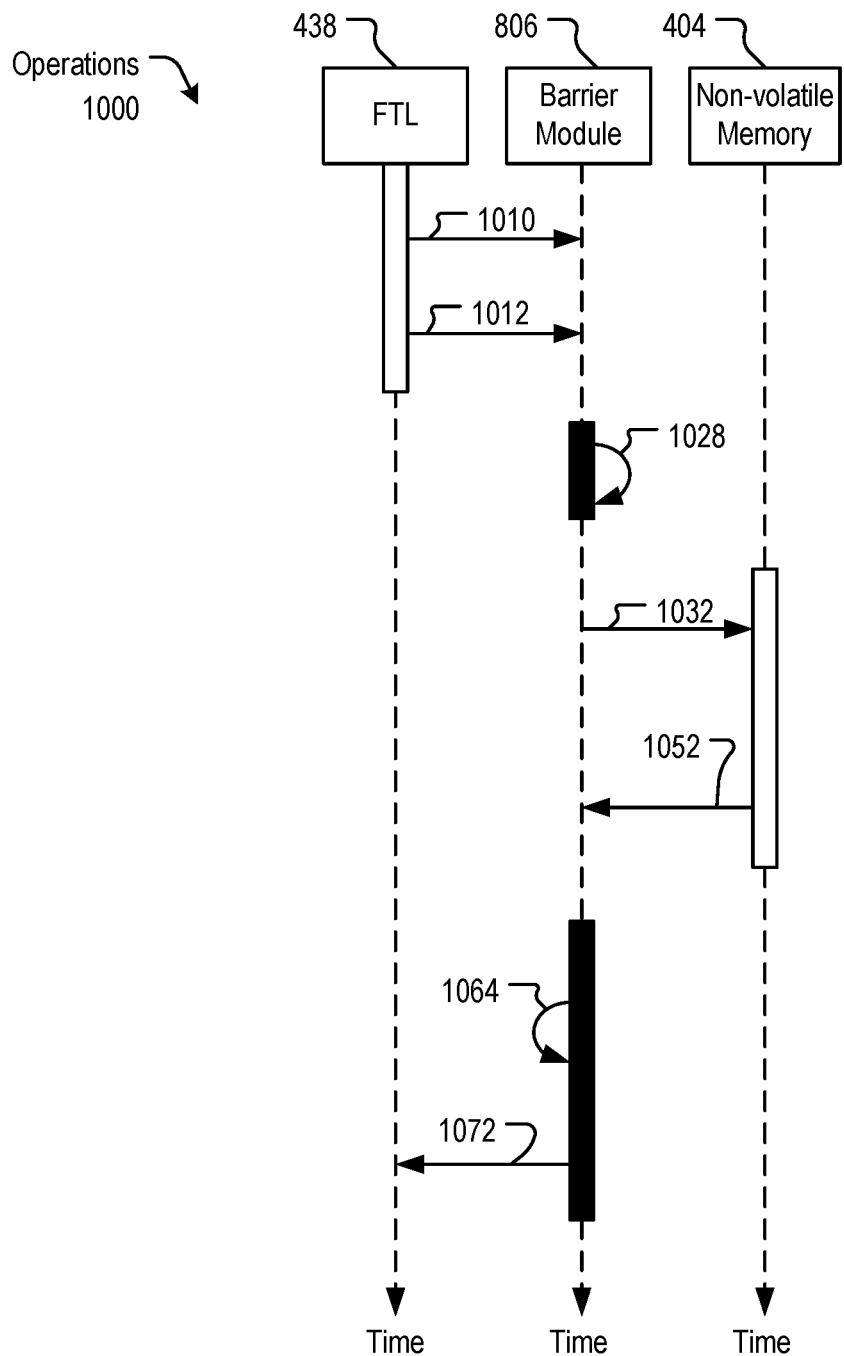
FIG. 10 is a diagram illustrating certain operations that may be performed by the data storage device of FIG. 4.

Referring to FIG. 10, a diagram illustrating operations of a data storage device is depicted and generally designated 1000. In an illustrative example, the operations 1000 may be performed by the data storage device 402 of FIG. 4. In the example of FIG. 10, the operations 1000 are described with reference to the non-volatile memory 404, the FTL 438, and the barrier module 806.

The operations 1000 may include generating a pre-barrier request, at 1010. For example, the FTL 438 may notify the barrier module 806 that the FTL 438 is to provide a barrier command to the barrier module 806.

The operations 1000 may further include generating a barrier request, at 1012. For example, the barrier request may correspond to the barrier command 454. The FTL 438 may provide the barrier request to the barrier module 806. In some implementations, the barrier module 806 may fetch the barrier request from the FTL 438. In some examples, the barrier module 806 may provide a barrier ID to the barrier module 806 in connection with the barrier request. For example, the barrier ID may correspond to any of the barrier IDs described with reference to FIG. 7.

The operations 1000 may further include initializing a counter, at 1028. For example, the value 450 of the counter 446 may be reset in response to issuance of the barrier command 454.

The operations 1000 further include providing a barrier service request, at 1032. The barrier service request may be provided by the barrier module 806 to the non-volatile memory 404, such as to a die state machine that may be included in the first memory die 406 or the second memory die 408, as illustrative examples.

The operations 1000 may further include providing a completion message to the barrier module 806, at 1052. The counter may be decremented, at 1064, such as by decrementing the value 450 of the counter 446. The operations 1000 may further include sending a completion message (e.g., to an FTL mailbox associated with the FTL 438 of FIG. 4), at 1072. For example, the completion message may correspond to a particular message of the one or more messages 426 of FIG. 4.

Figure 11:
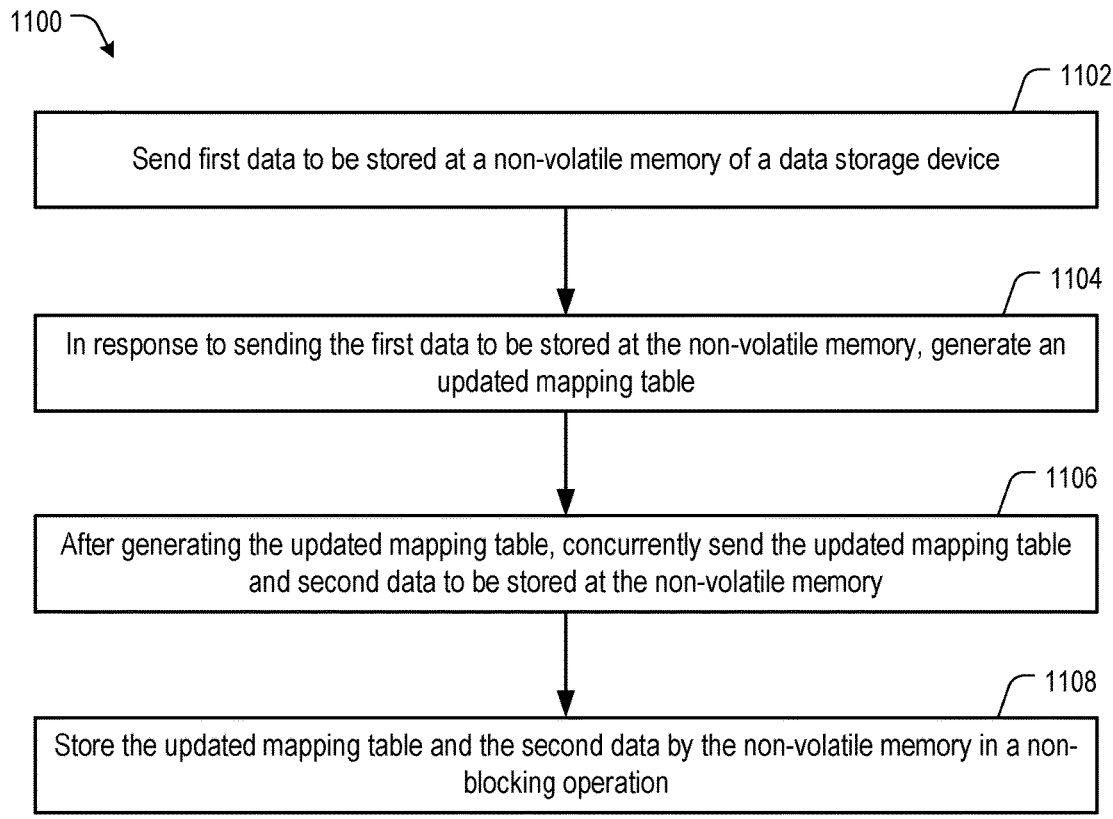
FIG. 11 is a flow chart of a particular illustrative example of a method of operation of the data storage device of FIG. 1.

Referring to FIG. 11, an illustrative example of a method of operation of a data storage device is depicted and generally designated 1100. In an illustrative example, the method 1100 is performed by the data storage device 102 of FIG. 1.

The method 1100 includes sending first data to be stored at a non-volatile memory of a data storage device, at 1102. For example, the controller 130 may send the first data 120 to be stored at the non-volatile memory 104 of the data storage device 102.

The method 1100 further includes generating, in response to sending the first data to be stored at the non-volatile memory, an updated mapping table, at 1104. For example, the control circuit 140 may be configured to access the control information 184 at the volatile memory 144 and to update the mapping table 186 to generate the updated control information 124.

The method 1100 further includes concurrently sending the updated mapping table and second data to be stored at the non-volatile memory after generating the updated mapping table, at 1106. For example, the controller 130 may send the second data 122 and the updated control information 124 to the non-volatile memory 104.

The method 1100 further includes storing the updated mapping table and the second data by the non-volatile memory in a non-blocking operation (e.g., a non-blocking CS operation where memory dies are not halted), at 1108. To illustrate, the non-volatile memory 104 may continue operations during storing of the updated control information 124 and the second data 122 (e.g., without "halting" the operations during a CS operation that writes the updated control information 124 to the non-volatile memory 104).

Figure 12:
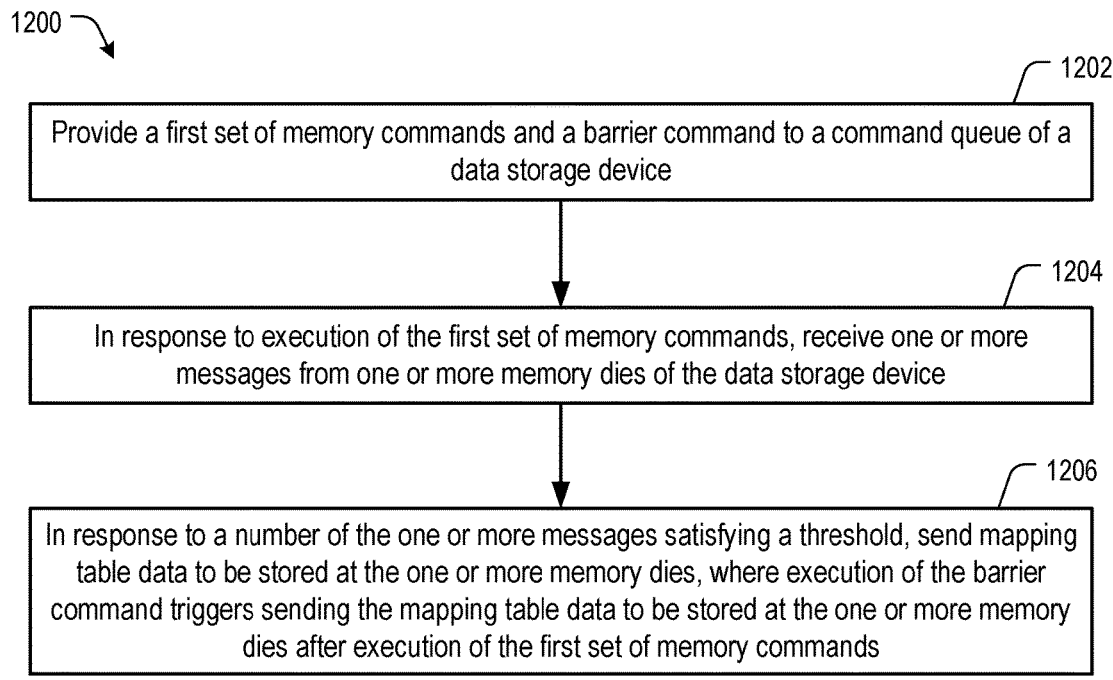
FIG. 12 is a flow chart of a particular illustrative example of a method of operation of the data storage device of FIG. 4.

Referring to FIG. 12, an illustrative example of a method of operation of a data storage device is depicted and generally designated 1200. In an illustrative example, the method 1200 is performed by the data storage device 402 of FIG. 4.

The method 1200 includes providing a first set of memory commands and a barrier command to a command queue of a data storage device, at 1202. For example, the first set of memory commands 452 and the barrier command 454 may be provided to the command queue 442 of FIG. 4.

The method 1200 further includes receiving, in response to execution of the first set of memory commands, one or more messages from one or more memory dies of the data storage device, at 1204. For example, the memory dies 406, 408 may provide the one or more messages 426 in response to executing the barrier command 454 (and after executing the first set of memory commands 452).

The method 1200 further includes sending, in response to a number of the one or more messages satisfying a threshold, mapping table data to be stored at the one or more memory dies, at 1206. Execution of the barrier command triggers sending the mapping table data to be stored at the one or more memory dies after execution of the first set of memory commands. To illustrate, the controller 430 may send the updated mapping table 428 to the non-volatile memory 404 in response to a number of the one or more messages 426 satisfying the threshold 448.

The method 1200 may further include performing continuous processing of user data written to the non-volatile memory by memory dies of the non-volatile memory during non-blocking control sync operations. For example, the non-volatile memory 404 may perform one or more additional non-blocking control sync operations after storing the mapping table 428 to the non-volatile memory 404, such as by re-updating the mapping table 428 and re-storing the mapping table 428 to the non-volatile memory 404 in a non-blocking manner (e.g., while performing continuous processing of user data written to the non-volatile memory 404 and without "blocking" writing of the user data to the non-volatile memory 404).

In another example, a data storage device is configured to perform a consolidation operation asynchronously with respect to a control sync operation. The consolidation operation and the control sync operation may be performed as separate non-blocking processes. In a particular example, the data storage device 402 of FIG. 4 is configured to perform a consolidation operation asynchronously with respect to a control sync operation.

A control sync operation performed by the data storage device may include writing a main table and updates to the main table to a non-volatile memory (e.g., by copying the main table from a volatile memory to the non-volatile memory). For example, the main table may include pointers to previous logical-to-physical (L2P) address "chunks" (or parts of an L2P mapping table) stored at the non-volatile memory (via a prior control sync operation). The main table may further include an "update layer" that indicates updates to the L2P mapping table (since the prior control sync operation). L2P mapping may be based on the data within L2P chunks plus possible deltas from the "update layer." Deltas may also be stored within a cache of the L2P chunks, referred to as CAT (Cached Address Translation). The CAT table may be stored in a volatile memory, such as in a static random access memory (SRAM). In some implementations, there is no "update layer," and updates are stored within the CAT, which may be evicted periodically to flash (or to another non-volatile memory) via a consolidation process.

A consolidation operation may include merging updates of the update layer (or updates stored in CAT) into the L2P chunks stored at the non-volatile memory. The consolidation operation may be performed to free space in the update layer or to merge CAT updates to flash (or to another non-volatile memory). For example, the update layer may become "full" and may be "evacuated" by copying updates associated with the update layer from the volatile memory to the non-volatile memory.

By separating a consolidation operation and a control sync operation, the operations may be "thinner" and may be implemented more efficiently and with less use of time and processing resources. Further, in some cases, frequency of consolidation operations (e.g., frequency of the update layer becoming "full") may be greater than frequency of control sync operations. By separating the operations, time and processing resources used to perform "unnecessary" control sync operations may be reduced (e.g., by performing control sync operations less frequently than consolidation operations).

A non-blocking consolidation operation may use an atomic technique that includes evacuating the update layer to the CAT table, if the CAT is not already updated. Evacuation of the update layer and compaction of the update layer (after update layer evacuation) may be performed together. In the event of an ungraceful shutdown (UGSD) after the non-blocking consolidation operation (and prior to a subsequent control sync operation), the data storage device may be "rolled back" to a state indicated by a previous version of the control table stored to the non-volatile memory using a previous control sync operation.

As a result of separating the operations and by rolling back to the last control sync state in case of an UGSD, updates to the CAT may be performed while the CAT chunks are being stored to the non-volatile memory. Accordingly, write operations need not be stopped or delayed (e.g., "blocked") during consolidation operations. Instead, updates associated with a write operation may be written to the update layer and to the CAT during a particular consolidation operation. The updates may be written to the non-volatile memory during a subsequent operation.

To further illustrate, in an example of a consolidation operation, SRAM copies of a mapping table may be updated, such as by modifying the update layer and optionally by modifying an SRAM cache of the corresponding L2P address chunk of the CAT table. To enable the consolidation operation to be non-blocking, updates to the update layer may be merged into the CAT table in an atomic manner per chunk (e.g., during operation of a central processing unit (CPU) of the data storage device). After merging the updates into the CAT table, the selected CAT chunks may be written to the non-volatile memory (e.g., using a consolidation operation). While performing the consolidation operation, requests for access to the non-volatile memory may be executed, such as by executing a request to write data to the non-volatile memory. Because the consolidation operation writes the CAT table (and not the update layer) to the non-volatile memory, the update layer may be modified during the consolidation operation (e.g., by modifying the update layer to indicate updated L2P address mappings as a result of executing the requests), and the update layer may be subsequently written to the non-volatile memory via a control sync operation that is performed after the consolidation operation.

In some circumstances, a particular request received during a consolidation operation may indicate an address that is targeted by the consolidation operation. As a result, an update may be applied to a particular cached L2P "chunk" that is also being written to the non-volatile memory (e.g., via the consolidation operation). In this case, an update may be written to the non-volatile memory prematurely (e.g., prior to host data associated with the particular request being committed to the non-volatile memory). A technique in accordance with the disclosure advantageously allows such a circumstance because new chunks written to the non-volatile memory may be used after a power-cycle only if there are additional control sync operations (as the pointers to the chunks are written during control sync operations). The control sync operation should commit previously written data to the non-volatile memory, including the data indicated by the particular request.

Although the foregoing description refers to particular examples of an update layer and a CAT table, it should be appreciated that the disclosure is not limited to such particular examples. To illustrate, non-blocking consolidation operations of FIGS. 13-16 are described with reference to a portion of a control table and cached L2P parts.

Figure 13:
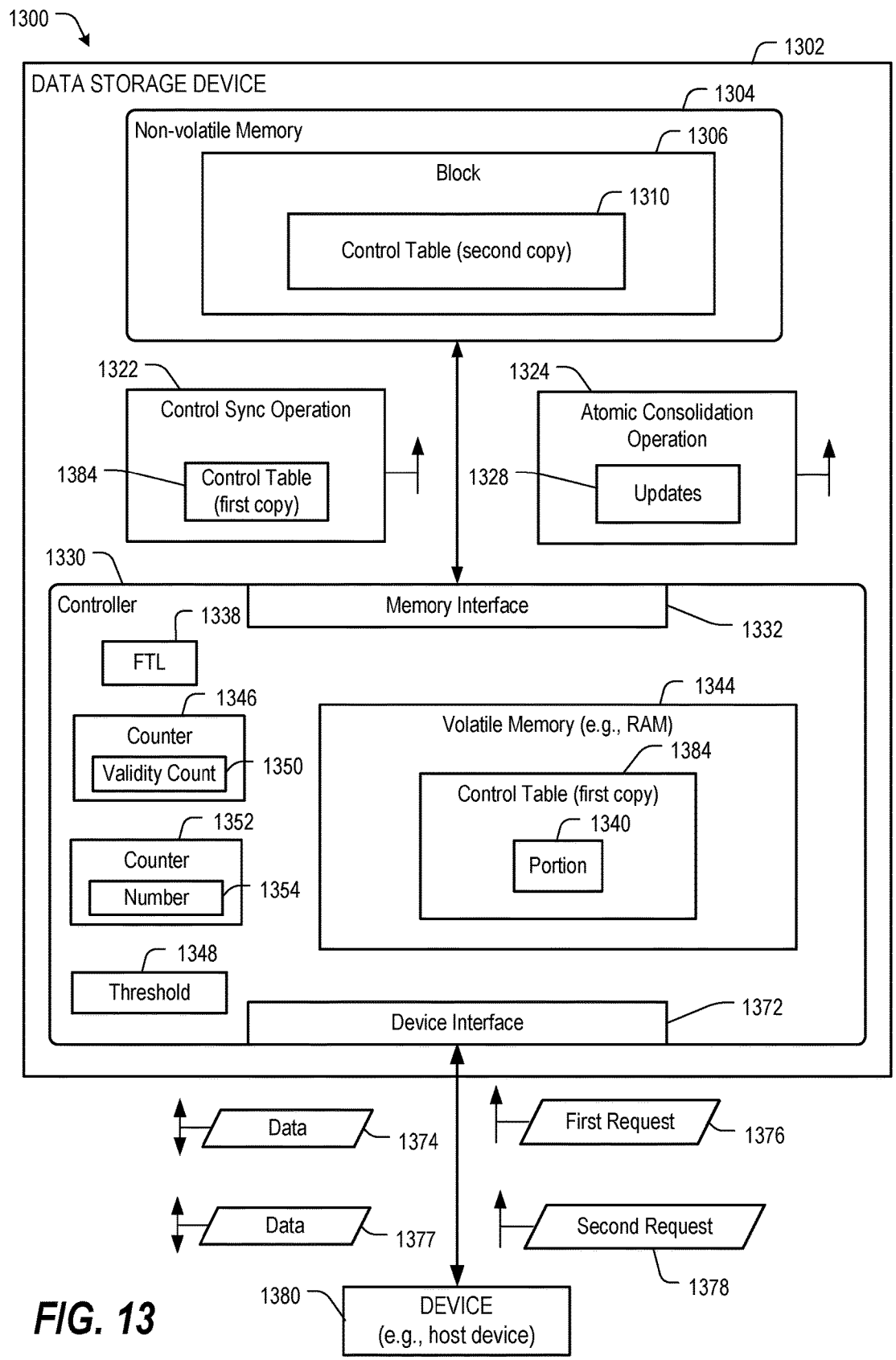
FIG. 13 is a diagram of an illustrative example of a system that includes a data storage device configured to perform non-blocking consolidation operations.

Referring to FIG. 13, a particular illustrative example of system is depicted and generally designated 1300. The system 1300 includes a data storage device 1302 and a device 1380 (e.g., a host device or an access device). The data storage device 1302 is configured to perform non-blocking consolidation operations.

The data storage device 1302 includes a non-volatile memory 1304 and a controller 1330. The controller 1330 is coupled to the non-volatile memory 1304.

The non-volatile memory 1304 includes a non-volatile array of storage elements included in one or more memory dies. One or more aspects of the non-volatile memory 1304 may be as described with reference to the non-volatile memory 104 of FIG. 1, the non-volatile memory 404 of FIG. 4, or a combination thereof. In an illustrative example, the non-volatile memory 1304 includes one or more of the first memory die 106 of FIG. 1, the second memory die 108 of FIG. 1, the first memory die 406 of FIG. 4, or the second memory die 408 of FIG. 4. The non-volatile memory 1304 includes one or more groups of storage elements, such as a representative block 1306.

The controller 1330 includes a memory interface 1332 to the non-volatile memory 1304 and further includes a device interface 1372 (e.g., a host interface) to the device 1380. The controller 1330 may further include a flash translation layer (FTL) 1338, a counter 1346, a counter 1352, and a volatile memory 1344. The volatile memory 1344 may include a random access memory (RAM), as an illustrative example.

The volatile memory 1344 is configured to store a first copy 1384 of a control table associated with the non-volatile memory 1304. The non-volatile memory 1304 may be configured to store a second copy 1310 of the control table. The controller 1330 may modify the first copy 1384 based on write operations performed at the non-volatile memory 1304 and may subsequently update the second copy 1310 based on changes to the first copy 1384 (e.g., by propagating changes of the first copy 1384 to the second copy 1310).

During operation, the controller 1330 may retrieve control information from the non-volatile memory 1304. As an example, in response to a power-up event at the data storage device 1302, the controller 1330 may retrieve the first copy 1384 from the non-volatile memory 1304 and mode store (e.g., cache) the first copy 1384 at the volatile memory 1344.

The controller 1330 may receive one or more requests from the device 1380 for access to the non-volatile memory 1304. For example, the device interface 1372 is configured to receive a first request 1376 for access to the non-volatile memory 1304 from the device 1380. In a particular example, the first request 1376 indicates data 1374 to be written to the non-volatile memory 1304. The controller 1330 may perform one or more operations based on the data 1374, such as by encoding the data 1374 to generate encoded data and sending the encoded data to be stored at the non-volatile memory 1304.

In some implementations, the FTL 1338 of the controller 1330 is configured to perform a logical-to-physical (L2P) address translation in response to the first request 1376. For example, the FTL 1338 may be configured to translate a logical address associated with the data 1374 to a physical address associated with the data 1374 prior to storing the data 1374 to the non-volatile memory 1304.

The controller 1330 is configured to perform a first update of a portion 1340 (e.g., an update layer) of the first copy 1384 in response to the first request 1376. For example, the portion 1340 may indicate L2P address translations prior to modification of the second copy 1310 to indicate the L2P address translations. As a particular example, the controller 1330 may perform the first update of the portion 1340 to indicate a particular L2P address translation performed in response to executing the first request 1376 prior to initiating a second update that consolidates the L2P address translation with the second copy 1310. The first update may include adding particular entry to a list of L2P address mappings indicated by the portion 1340.

In some implementations, the controller 1330 is configured to update a validity count 1350 in response to executing the first request 1376. For example, the validity count 1350 may indicate a number of invalid pages associated with the non-volatile memory 1304, and the controller 1330 may update the validity count 1350 in response to moving data associated with a particular physical address to another physical address of the non-volatile memory 1304.

After performing the first update of the portion 1340 of the first copy 1384 in response to the first request 1376, the controller 1330 may initiate a second update of the second copy 1310 at the non-volatile memory 1304 based on the first update. For example, the second update may be included in an atomic consolidation operation 1324 to merge modifications associated with the first copy 1384 at the volatile memory 1344 with the second copy 1310 at the non-volatile memory 1304, such as by storing updates 1328 to the non-volatile memory 1304 to indicate the modifications associated with the first copy 1384.

In a particular example, the controller 1330 may perform the second update in response to detecting that a number of modifications made to the first copy 1384 satisfies a threshold 1348. To illustrate, the counter 1352 may be configured to store a value 1354 indicating a number of modifications to the first copy 1384 performed since a previous update to the second copy 1310. In response to receiving the first request 1376, the controller 1330 may be configured to modify (e.g., increment) the value 1354 and to determine whether the value 1354 satisfies the threshold 1348. As a non-limiting illustrative example, the threshold 1348 may correspond to 10 modifications, 20 modifications, or another number of modifications, and the controller 1330 may be configured to perform the second update in response to detecting that the value 1354 is greater than or equal to 10, 20, or another number.

In a particular example, the controller 1330 configured to perform a compaction operation at the volatile memory 1344 in response to performing the second update. For example, after performing the second update, the controller 1330 may "clear" (or "empty") a data structure corresponding to the portion 1340 (e.g., to enable subsequent L2P entries to be added to the portion 1340).

The second update is non-blocking with respect to one or more other operations that may be performed by the data storage device 1302. For example, the data storage device 1302 may be configured to perform one or more operations concurrently with the second update. To further illustrate, the controller 1330 is configured to execute a second request 1378 for access to the non-volatile memory 1304 concurrently with the second update (e.g., instead of blocking performance of the second request 1378 until completion of the second update, or vice versa). As an illustrative example, the second request 1378 may indicate a write operation to write data 1377 to the non-volatile memory 1304, and the second request 1378 may write the data 1377 to the non-volatile memory 1304 concurrently with performing the second update.

The controller 1330 is configured to perform a control sync operation 1322. The control sync operation 1322 may include storing the first copy 1384 to the non-volatile memory 1304 (e.g., by "merging" changes made to the first copy 1384 with the second copy 1310). The controller 1330 may be configured to perform the control sync operation 1322 to copy first copy 1384 of the control table to the non-volatile memory 1304 independently of the atomic consolidation operation 1324.

The control sync operation 1322 may "commit" changes associated with the second update to the non-volatile memory 1304. To further illustrate, the second update may be performed on an atomic basis, where the second update either succeeds or fails. Performance of the control sync operation 1322 may cause the second update to succeed, such as by "committing" changes associated with the second update.

Alternatively, in some circumstances, the second update may fail. For example, in some cases, an ungraceful shutdown (UGSD) event may occur prior to the control sync operation 1322. The UGSD event may cause information stored at the volatile memory 1344 to be lost from the data storage device 1302. For example, an UGSD event that occurs prior to the control sync operation 1322 may cause the first copy 1384 to be lost from the volatile memory 1344 (and from the data storage device 1302).

The controller 1330 is configured to detect an UGSD event after the second update and to re-perform operations associated with the second update after the UGSD event. For example, the second copy 1310 may indicate a last opened block of the non-volatile memory 1304, such as the block 1306. The controller 1330 may be configured to re-perform the operations by scanning the block 1306 to identify data written to the non-volatile memory 1304 prior to the UGSD event, such as by identifying the data 1374, the data 1377, or both. As an illustrative example, the controller 1330 may scan metadata (e.g., header information) of the data 1374, 1377 to determine that the data 1374, 1377 was written to the non-volatile memory 1304 after a previous control sync operation (e.g., a control sync operation that wrote the first copy 1384 to the non-volatile memory 1304) and prior to the UGSD event.

The controller 1330 may be configured to re-perform one or more operations associated with the second update in response to identifying data written to the non-volatile memory 1304 prior to the UGSD event. For example, after retrieving the first copy 1384 from the non-volatile memory 1304 and storing (e.g., caching) the first copy 1384 at the volatile memory 1344, the controller 1330 may update the second copy 1310 (e.g., to generate the first copy 1384) and may re-perform the control sync operation 1322.

The control sync operation 1322 may be blocking with respect to one or more requests from the device 1380. For example, the controller 1330 may be configured to block execution of a request until completion of the control sync operation 1322 (or vice versa).

The control sync operation 1322 may include copying pointer information from the volatile memory 1344 to the non-volatile memory 1304, such as by copying a pointer indicating a location of the non-volatile memory 1304 storing the second copy 1310 of the control table (e.g., including the updates 1328). In this case, the controller 1330 is configured to update a pointer within the control table to indicate a location of the second copy 1310 of the control table in the non-volatile memory 1304.

One or more aspects described with reference to FIG. 13 may enable a consolidation operation (e.g., the atomic consolidation operation 1324) to be performed in a non-blocking manner with risk of data loss due to an UGSD event. If an UGSD event occurs prior to performance of a control sync operation that "commits" changes of the consolidation operation, operations of the update operation may be re-performed (or "replayed") after start-up of the data storage device 1302. Consequently, a consolidation operation may be performed in a non-blocking manner without risk of data loss due to an UGSD event.

Figure 14:
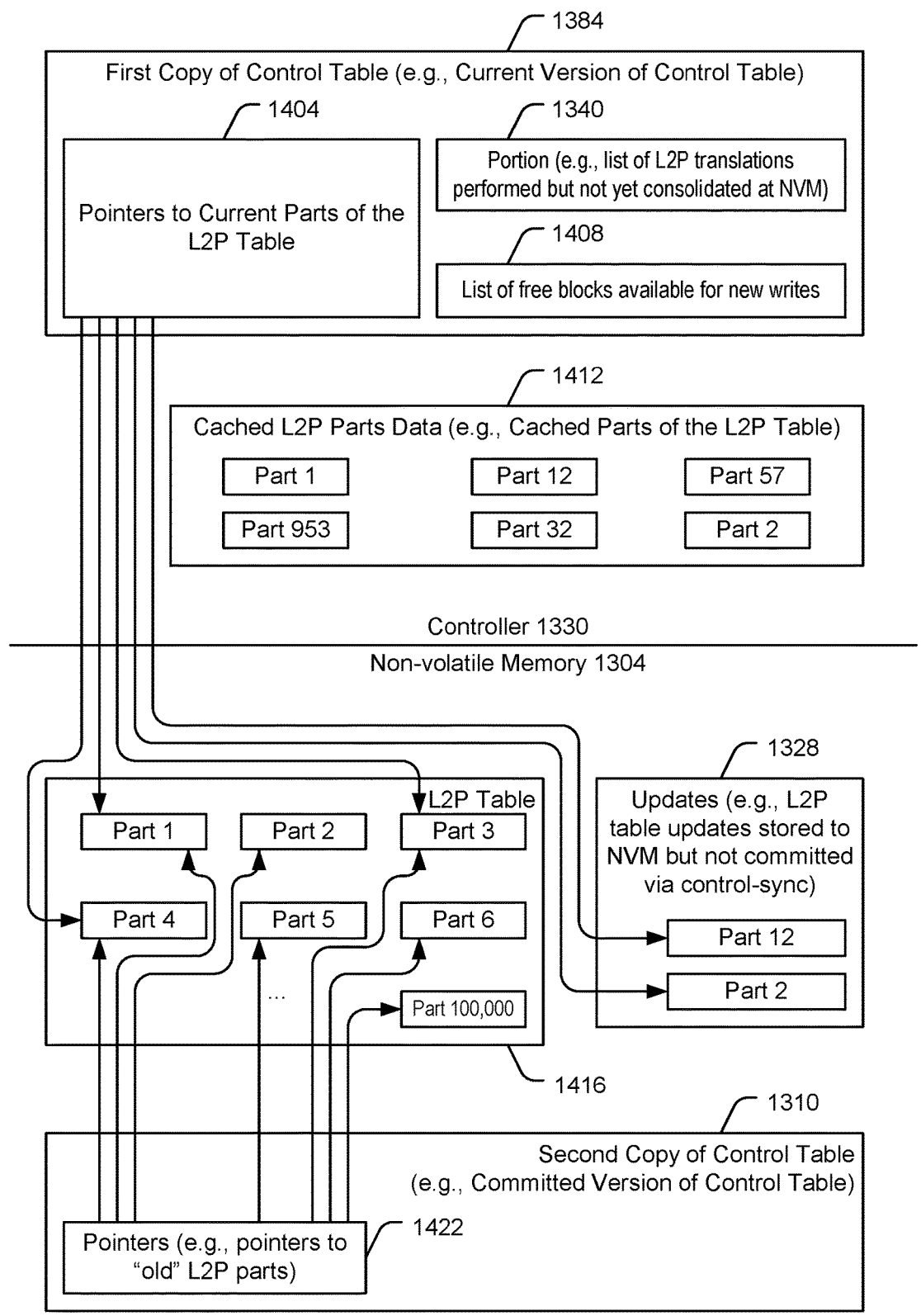
FIG. 14 is a block diagram illustrating certain examples of operations that may be performed at the data storage device of FIG. 13.

FIG. 14 is a block diagram illustrating certain examples of operations that may be performed at the data storage device 1302 of FIG. 13. In a particular example, features associated with the controller 1330 are illustrated in the top portion of FIG. 14, and features associated with the non-volatile memory 1304 are illustrated in the bottom portion of FIG. 14.

FIG. 14 depicts certain illustrative aspects of the first copy 1384 (e.g., a current version of a control table). For example, the first copy 1384 may include pointers 1404 (e.g., pointers indicating current sections, also referred to as "chunks" or "parts" of an L2P table), a list 1408 of free blocks available for new writes, and the portion 1340. In a particular example, the portion 1340 comprises (or corresponds to) an update data structure having multiple lists of address modifications, each of the multiple lists corresponding to a distinct set of logical block addresses (LBAs). For example, the portion 1340 may indicate a list of L2P translations performed but not yet consolidated at the non-volatile memory 1304.

The controller 1330 may also store cached L2P parts 1412 (e.g., a CAT table). To further illustrate, the example of FIG. 14 depicts that the cached L2P parts 1412 may include parts 1, 2, 12, 32, 57, and 953. To illustrate, each L2P part may correspond to a range of LBAs (e.g., a 32 kilobyte (kB) portion mapping a 32 megabyte (MB) range of logical addresses to physical addresses) and may include physical address translations for the LBAs. Thus, rather than copying the entire L2P table from the non-volatile memory 1304 to the volatile memory 1344, segments of the table that are to be updated may be copied to the volatile memory 1334 as the cached L2P parts 1412.

The non-volatile memory 1304 may store an L2P table 1416. In the illustrative example of FIG. 14, the L2P table 1416 includes parts 1, 2, 3, 4, 5, 6, . . . 100,000. For example, part 1 may include translation data for a first 32 MB range of logical addresses (e.g., 0-32 MB), part 2 may include translation data for a second 32 MB range of logical addresses (e.g., 32-64 MB), etc. Although 100,000 parts are illustrated (e.g., supporting a 3.2 terabyte (TB) range of logical addresses), in other implementations the L2P table 1416 may include fewer than 100,000 parts or more than 100,000 parts, such as based on the storage capacity of the non-volatile memory 1304 and the size of each of the L2P parts.

The non-volatile memory 1304 also stores the updates 1328. For example, the updates 1328 may be stored to the non-volatile memory 1304 via the atomic consolidation operation 1324. In the illustrative example of FIG. 14, the updates 1328 include parts 2 and 12.

The non-volatile memory 1304 also stores the second copy 1310 (e.g., a committed version of a control table). The second copy 1310 may include information that is "old" or "stale" as compared to the first copy 1384 (e.g., information that has not been "synced" with the first copy 1384 via the control sync operation 1322 of FIG. 13). For example, the second copy 1310 may include pointers 1422 that indicate "old" L2P parts.

To illustrate, the pointers 1422 of the second copy 1310 may indicate (e.g., point to) parts 1, 2, 3, and 4 of the L2P table 1416. In the example of FIG. 14, the pointers 1404 of the first copy 1384 indicate an update to part 2. For example, data associated with a particular logical address may be copied from a first physical address to a second physical address, and the data at the first physical address may be invalidated. As a result, the updates 1328 may be written to the non-volatile memory 1304 (e.g., via the atomic consolidation operation 1324) to indicate the second physical address (instead of the first physical address). Prior to performance of the control sync operation 1322, control information stored at the non-volatile memory 1304 may indicate the "old" physical address (the first physical address). Upon performance of the control sync operation 1322, control information stored at the non-volatile memory 1304 may indicate the "correct" physical address (the second physical address). A specific example of operation including components of FIG. 14 is described in further detail with reference to FIG. 15.

The example of FIG. 14 illustrates that a consolidation operation and a control sync operation may be performed separately at the data storage device 1302. As a result, one or more operations of a consolidation operation may be "replayed" in the event of an UGSD event prior to performance of the control sync operation.

Figure 15:
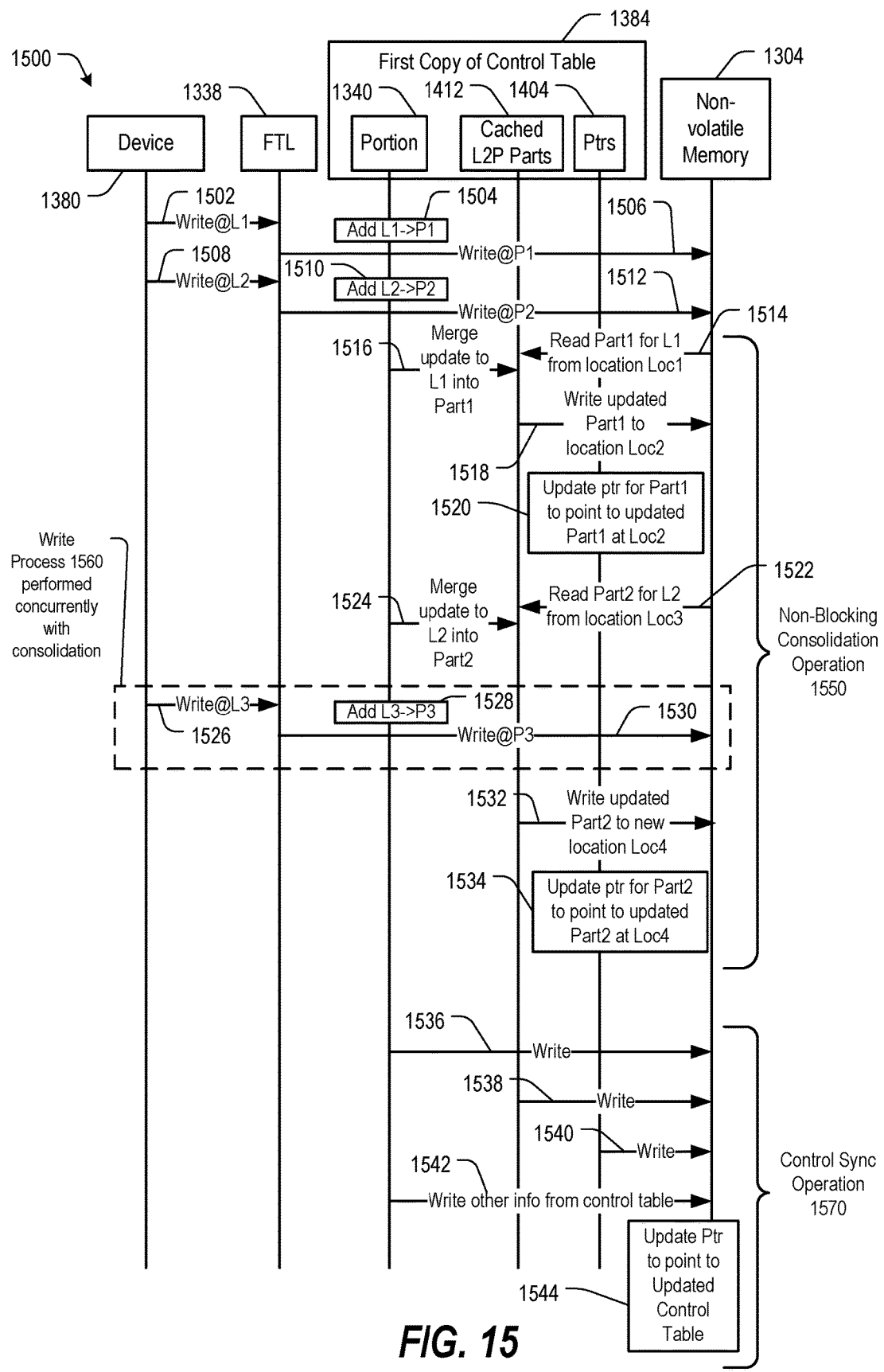
FIG. 15 is a ladder diagram illustrating certain examples of operations that may be performed at the data storage device of FIG. 13.

FIG. 15 is a ladder diagram illustrating certain examples of operations 1500 that may be performed at the data storage device 1302 of FIG. 13. In the example of FIG. 13, the operations 1500 are described with reference to the device 1380, the FTL 1338, the first copy 1384 of the control table, and the non-volatile memory 1304.

The operations 1500 include receiving a first write command indicating a first logical address, at 1502. For example, the first write command may correspond to a particular request received from the device 1380 of FIG. 13.

The operations 1500 further include adding a first L2P address mapping to the portion 1340 of the first copy 1384, at 1504. For example, the controller 1330 may update the portion 1340 to indicate that the first logical address is associated with a first physical address of the non-volatile memory 1304, such as by adding an entry to the portion 1340 to indicate that the first logical address is associated with the first physical address.

The operations 1500 further include performing a first write operation associated with the first physical address to execute the first write command, at 1506. For example, the data storage device 1302 may write data indicated by the first write command to the non-volatile memory 1304.

The operations 1500 further include receiving a second write command indicating a second logical address, at 1508. For example, the second write command may correspond to the first request 1376 of FIG. 13.

The operations 1500 further include adding a second L2P address mapping to the portion 1340, at 1510. For example, the controller 1330 may update the portion 1340 to indicate that the second logical address is associated with a second physical address of the non-volatile memory 1304, such as by adding an entry to the portion 1340 to indicate that the second logical address is associated with the second physical address.

The operations 1500 further include performing a second write operation associated with the second physical address to execute the second write command, at 1512. For example, the data storage device 1302 may write the data 1374 to the non-volatile memory 1304.

The operations 1500 further include reading a first L2P part associated with the first logical address from a first location of the non-volatile memory 1304, at 1514. For example, the first L2P part may be retrieved from the L2P table 1416 in the non-volatile memory 1304 and may be stored (e.g., cached) at the volatile memory 1344 within the cached L2P parts 1412.

The operations 1500 further include merging an update of the first logical address into the first L2P part, at 1516. For example, the controller 1330 may modify the first L2P part to indicate the first L2P address mapping (e.g., by merging the first L2P address mapping with the first L2P part to generate an updated first L2P part).

The operations 1500 further include writing the updated first L2P part to a second location of the non-volatile memory 1304, at 1518. For example, the data storage device 1302 may retrieve the updated first L2P part from the volatile memory 1344 and may copy the updated first L2P part into the updates 1328 in the non-volatile memory 1304 (e.g., to indicate the "correct" L2P mapping associated with the first logical address).

The operations 1500 further include updating a pointer associated with the first L2P part to indicate the second location, at 1520. For example, a first pointer of the pointers 1404 may be updated to indicate the second location instead of the first location (e.g., to indicate that the second location stores the "correct" mapping associated with the first logical address).

The operations 1500 further include reading a second L2P part associated with the second logical address from a third location of the non-volatile memory 1304, at 1522. For example, the second L2P part may be retrieved from the L2P table 1416 in the non-volatile memory 1304 and may be stored (e.g., cached) at the volatile memory 1344 within the cached L2P parts 1412.

The operations 1500 further include merging an update of the second logical address into the second L2P part, at 1524. For example, the controller 1330 may modify the second L2P part to indicate the second L2P address mapping (e.g., by merging the second L2P address mapping with the second L2P part to generate an updated second L2P part).

The operations 1500 further include writing the updated second L2P part to a fourth location of the non-volatile memory 1304, at 1532. For example, the data storage device 1302 may retrieve the updated second L2P part from the volatile memory 1344 and may copy the updated second L2P part to the updates 1328 in the non-volatile memory 1304 (e.g., to indicate the "correct" L2P mapping associated with the second logical address). In a particular example, the operation 1532 corresponds to the second update described with reference to FIG. 13.

The operations 1500 further include updating a pointer associated with the second L2P part to indicate the second location, at 1534. For example, a second pointer of the pointers 1404 may be updated to indicate the fourth location instead of the third location (e.g., to indicate that the second location stores the "correct" mapping associated with the second logical address).

In the example of FIG. 15, the operations 1514, 1516, 1518, 1520, 1522, 1524, 1532, and 1534 are performed in connection with a non-blocking consolidation operation 1550. The non-blocking consolidation operation 1550 may correspond to the atomic consolidation operation 1324 described with reference to FIG. 13.

The non-blocking consolidation operation 1550 may be performed concurrently with one or more other operations at the data storage device 1302. To illustrate, the example of FIG. 15 shows that one or more operations associated with a write process 1560 may be performed during the non-blocking consolidation operation 1550. One or more operations of the write process 1560 may be performed during the non-blocking consolidation operation 1550 and without delaying (or "blocking") the write process 1560 until completion of the non-blocking consolidation operation 1550.

To further illustrate, the write process 1560 may include receiving a third write command indicating a third logical address, at 1526. For example, the third write command may correspond to the second request 1378 received from the device 1380 of FIG. 13. The write process 1560 may further include adding a third L2P address mapping to the portion 1340 of the first copy 1384, at 1528. For example, the controller 1330 may update the portion 1340 to indicate that the third logical address is associated with a third physical address of the non-volatile memory 1304, such as by adding an entry to the portion 1340 to indicate that the third logical address is associated with the third physical address. The write process 1560 may further include performing a third write operation associated with the third physical address to execute the third write command, at 1530. For example, the data storage device 1302 may write data indicated by the third write command to the non-volatile memory 1304, such as by writing the data 1377 to the non-volatile memory 1304.

After performance of the non-blocking consolidation operation 1550, the operations 1500 may further include performing a control sync operation 1570. In a particular example, the control sync operation 1570 corresponds to the control sync operation 1322 of FIG. 13. The control sync operation 1570 may be performed to "commit" operations of the non-blocking consolidation operation 1550 (e.g., so that operations of the non-blocking consolidation operation 1550 "succeed").

The control sync operation 1570 may include writing the portion 1340 to the non-volatile memory 1304, at 1536. The control sync operation 1570 may further include writing the cached L2P parts 1412 to the non-volatile memory 1304, at 1538, and writing the pointers 1404 to the non-volatile memory 1304, at 1540. For example, the portion 1340, the cached L2P parts 1412, and the pointers 1404 may be written to the non-volatile memory 1304 by writing the first copy 1384 of FIG. 13 to the non-volatile memory 1304.

The control sync operation 1570 may optionally include writing other information from the control table to the non-volatile memory 1304, at 1542. As an illustrative example, the list 1408 of free blocks available for new writes may be written to the non-volatile memory 1304.

The control sync operation 1570 may further include updating a pointer to indicate the updated control table, at 1544. For example, a pointer stored by the non-volatile memory 1304 may be updated to indicate a particular location of the non-volatile memory 1304 storing the first copy 1384 upon performance of the control sync operation 1570.

The example of FIG. 15 illustrates that a consolidation operation may be performed in a non-blocking manner to avoid delaying (or "blocking") operations of a write process, such as the write process 1560. As a result, latency may be decreased.

In addition to the latency reduction resulting from the non-blocking consolidation operation 1550, additional latency reduction may result based on a structure of the portion 1340. For example, in an implementation where the portion 1340 includes a single, non-sorted list of LBA mappings, locating all LBA mappings corresponding to a single L2P part (e.g., all LBAs within a specified range) within the list for consolidation may include a relatively lengthy, linear-time search over a relatively large number of entries in the list, repeated for each of the L2P parts to be modified based on entries in the portion 1340.

Latency associated with such linear-time searches may be reduced by arranging the portion 1340 as multiple lists of LBA mappings. Address ranges associated with each of the multiple lists may be interleaved among the lists. For example, a first list may track L2P mappings corresponding to part 1 of the L2P table, a second list may track L2P mappings corresponding to part 2 of the L2P table, etc., up to a 256th list corresponding to part 256 of the L2P table. The first list may also track mappings corresponding to part 257, the second list may also track mappings corresponding to part 258, and so on. Generally, list number "n" (n=1 to 256) may track mappings for part n, n+256, n+512, etc. Because each process that accesses the non-volatile memory 1304 may access a range of memory addresses not greater than 8 gigabytes (GB), each process will affect no more than a single part assigned to each of the lists. Thus, each list that contains mapping information associated with the process contains only mapping information of a single part (e.g., the first list only contains mappings for part 1, and not for part 257, 513, etc.). The linear-time searches associated with a single-list structure of the portion 1340 may therefore be reduced or eliminated. It should be understood that the number of lists (256) and the range of addresses of a process (8 GB) are illustrative only, and other implementations may include other numbers of lists and other ranges of addresses.

Figure 16:
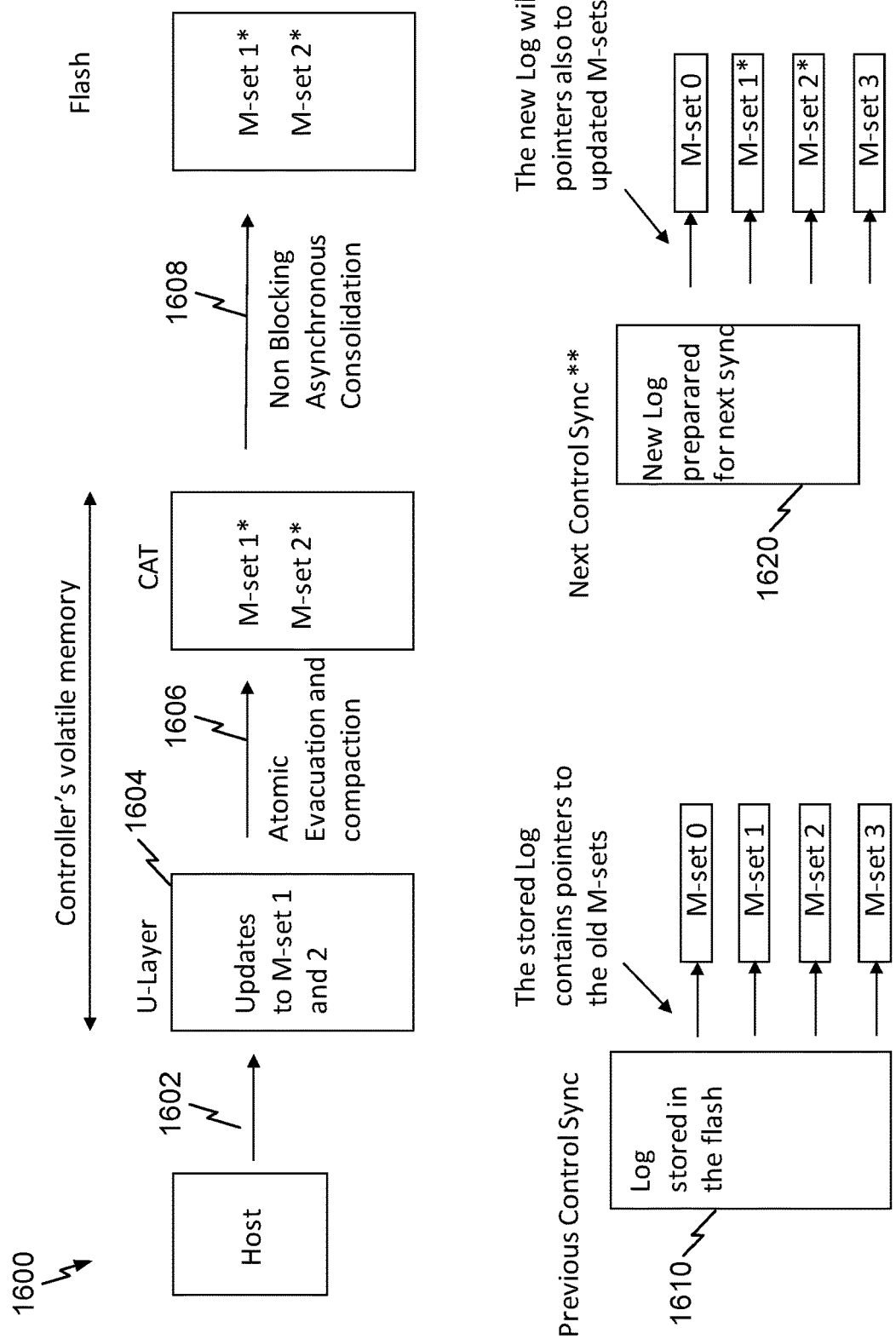
FIG. 16 is a diagram illustrating certain examples of operations that may be performed at the data storage device of FIG. 13.

FIG. 16 depicts certain illustrative examples of operations 1600 that may be performed by a data storage device. For example, the operations 1600 of FIG. 16 may be performed by the data storage device 1302 of FIG. 13.

The operations 1600 include communicating with a host, at 1602. For example, the data storage device 1302 may receive one or more requests for access to the non-volatile memory 1304, such as by receiving the first request 1376.

The operations 1600 further include performing updates to a first m-set (m-set 1) and to a second m-set (m-set 2) of an update layer (U-layer) in a volatile memory, at 1604. For example, the controller 1330 may be configured to update L2P mappings indicated by the portion 1340 at the volatile memory 1344 in response to the first request 1376.

The operations 1600 further include performing atomic evacuation and compaction to concurrently evacuate and compact the U-layer to a cached address translation table (CAT) in the volatile memory (e.g., to generate m-set 1\* and m-set 2\*), at 1606. For example, the controller 1330 may be configured to evacuate and compact the portion 1340 to the cached L2P parts 1412.

The operations 1600 further include performing non-blocking asynchronous consolidation (e.g., to write m-set 1\* and m-set 2\* to a flash or other non-volatile memory), at 1608.

For example, the controller 1330 may be configured to perform the atomic consolidation operation 1324 or the non-blocking consolidation operation 1550.

The operations 1600 further include writing a log 1620 that includes pointers to new updated m-sets (e.g., to point to the m-sets 1\*, 2\*) to the non-volatile memory in a next non-blocking control sync operation (e.g., either of the control sync operations 1322, 1570). Updating the pointers to the new updated m-sets may update the log as compared to an "old" log 1610 that indicates "old" m-sets (the m-sets 1, 2). The log 1610 includes pointers to "old" m-sets (the m-sets 1, 2), and the log 1620 includes pointers to the "new" m-sets (the m-sets 1\*, 2\*). For example, the logs 1610, 1620 may respectively correspond to the copies 1310, 1384 of a control table, and the second copy 1310 of the control table may be updated based on the first copy 1384 of the control table. The second copy 1310 may include the pointers 1422 to "old" L2P parts, and the first copy 1384 may include pointers 1404 to "current" L2P parts, as depicted in the example of FIG. 14.

The non-blocking control sync operation may be performed in a non-blocking manner using a barrier command. For example, the barrier command may correspond to the barrier command 454 of FIG. 4. The barrier command may enable coherency data and control information written to the non-volatile memory.

The operations 1600 may optionally include detecting a UGSD event. In this case, control tables may be rolled back and recovered, such as by retrieving a last stored log from the non-volatile memory and writing the last stored log to the volatile memory. In this case, recent updates that were already performed in the volatile memory U-Layer and CAT by the controller will be lost and ignored without loss of coherency.

Figure 17:
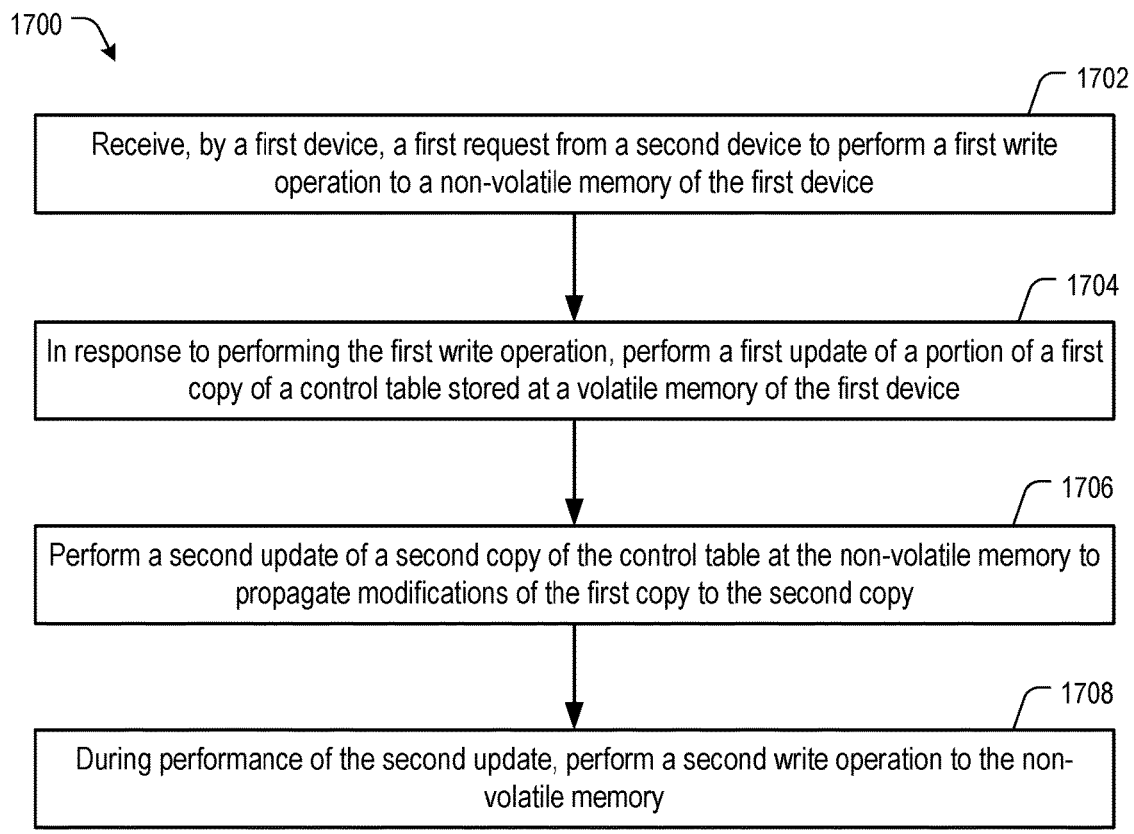
FIG. 17 is a flow chart of a particular illustrative example of a method of operation of the data storage device of FIG. 13.

FIG. 17 is a flow chart of a particular illustrative example of a method 1700 of operation of device. For example, the method 1700 may be performed by the data storage device 1302 of FIG. 13.

The method 1700 includes receiving, by a first device, a first request from a second device to perform a first write operation to a non-volatile memory of the first device, at 1702. For example, the first device may correspond to the data storage device 1302, and the second device may correspond to the device 1380. The data storage device 1302 may receive the first request 1376 to write the data 1374 to the non-volatile memory 1304 from the device 1380.

The method 1700 further includes performing, in response to performing the first write operation, a first update of a portion of a first copy of a control table stored at a volatile memory of the first device, at 1704. For example, the data storage device 1302 may update information at the volatile memory 1344, such as by performing the operation 1504 or the operation 1510 of FIG. 15.

The method 1700 further includes performing a second update of a second copy of the control table at the non-volatile memory to propagate modifications of the first copy to the second copy, at 1706. For example, the data storage device 1302 may perform the atomic consolidation operation 1324 or the non-blocking consolidation operation 1550 to write an L2P mapping associated with the first write operation from the volatile memory 1344 to the non-volatile memory 1304, such as by performing the operation 1518 or the operation 1532 of FIG. 15.

The method 1700 further includes performing a second write operation to the non-volatile memory during performance of the second update, at 1708. For example, the second write operation may correspond to a write operation performed based on the second request 1378. As another example, the second write operation may correspond to the operation 1530 of FIG. 15.

In conjunction with the described embodiments, an apparatus includes a non-volatile memory (e.g., the non-volatile memory 1304) and a controller (e.g., the controller 1330) coupled to the non-volatile memory. The controller includes a volatile memory (e.g., the volatile memory 1344) and is configured to perform separate non-blocking control sync operations (e.g., the control sync operations 1322, 1570) and non-blocking consolidation operations (e.g. one or more of the atomic consolidation operation 1324, the non-blocking consolidation operation 1550, or the non-blocking asynchronous consolidation 1606).

The controller may be configured to perform the non-blocking consolidation operations asynchronously with a different rate with respect to the non-blocking control sync operations as required by an update layer fill state. For example, the controller 1330 may perform the non-blocking consolidation operations in response to detecting that the number 1354 of modifications to the portion 1340 satisfies the threshold 1348 (e.g., the controller 1330 may "evacuate" the portion 1340 in response to detecting a "fill state" of the portion 1340 based on the number 1354). The non-blocking consolidation operations may occur independently of (and with a different frequency as compared to) the non-blocking control sync operations.

The non-blocking consolidation operations may be atomic operations that include concurrent evacuation and compaction of an update layer (U-Layer) to a cached address translation table (CAT) in the volatile memory. For example, the portion 1340 may be concurrently evacuated and compacted to the cached L2P parts 1412 at the volatile memory 1344.

The controller may be configured to continue performing updates to the U-Layer and the CAT in the volatile memory (e.g., to cached L2P chunks, also referred to herein as "m-sets") while the updated m-sets are written to a flash or other non-volatile memory. In this example, a consolidation operation is performed that is non-blocking with respect to one or more other operations (e.g., without blocking writing of updated control tables to non-volatile memory, as in certain devices that perform control sync operations and consolidation operations synchronously).

The controller may be configured to continue performing host write operations to the non-volatile memory concurrently with the non-blocking consolidation operations and non-blocking control sync operations. For example, the second request 1378 may be executed concurrently with the non-blocking consolidation operations and non-blocking control sync operations.

The controller may be configured to update a log that includes pointers to new updated m-sets and store the log in the non-volatile memory in a next non-blocking control sync operation using a barrier command. The barrier command may enable coherency of the data and the control data written to the non-volatile memory. To illustrate, the log may correspond to the second log 1620, and the barrier command may correspond to the barrier command 454 of FIG. 4.

The controller may be configured, in case of an ungraceful shutdown (UGSD) event, to rollback and recover control tables to the volatile memory according to a last stored log from a last stored non-blocking control sync in the non-volatile memory and in such case recent updates that were already performed in the U-Layer and CAT by the controller will be lost and ignored without loss of coherency. For example, the "rollback" may include retrieving the second copy 1310 from the non-volatile memory 1304 and storing the second copy 1310 to the volatile memory 1344.

In conjunction with the described embodiments, an apparatus includes a non-volatile memory (e.g., the non-volatile memory 1304) and a controller (e.g., the controller 1330) coupled to the non-volatile memory. The controller includes a volatile memory (e.g., the volatile memory 1344) and is configured to perform non-blocking control sync operations (e.g., the control sync operations 1322, 1570). The controller is further configured to perform non-blocking consolidation operations (e.g. one or more of the atomic consolidation operation 1324, the non-blocking consolidation operation 1550, or the non-blocking asynchronous consolidation 1606) asynchronously with respect to the non-blocking control sync operations. In a particular illustrative example, the non-blocking consolidation operations are atomic operations that include concurrent evacuation and compaction of an update layer (e.g., the portion 1340) to a cached address translation table (e.g., the cached L2P parts 1412) in the volatile memory. The controller may be configured to perform host write operations to the non-volatile memory concurrent to the non-blocking consolidation operations (e.g., by executing the second request 1378).

In conjunction with the described embodiments, an apparatus includes means (e.g., the non-volatile memory 1304) for storing data. The apparatus further includes means (e.g., the device interface 1372) for receiving a first request (e.g., the first request 1376) for access to the means for storing data from an access device (e.g., from the device 1380). The apparatus further includes means (e.g., the volatile memory 1344) for storing a portion (e.g., the portion 1340) of a first copy (e.g., the first copy 1384) of a control table associated with the means for storing data. The apparatus further includes means (e.g., the controller 1330) for performing a first update of the portion of the first copy of the control table in response to the first request, for initiating a second update of a second copy of the control table at the means for storing data based on the first update, and for performing a second request (e.g., the second request 1378) for access to the means for storing data concurrently with of the second update. In an illustrative example, the apparatus further includes means (e.g., the memory interface 1332) for providing the updated portion of the first copy of the control table to the means for storing data.

Although various components depicted herein are illustrated as block components and described in general terms, such components may include one or more microprocessors, state machines, or other circuits configured to enable such components to perform one or more operations described herein. For example, one or more aspects of the controllers 130, 430, and 1330 may represent physical components, such as hardware controllers, state machines, logic circuits, or other structures, to enable the controllers 130, 430, and 1330 to perform non-blocking operations.

Alternatively or in addition, certain aspects of the data storage devices 102, 402, and 1302 may be implemented using a microprocessor or microcontroller. In a particular embodiment, one or more aspects of the controllers 130, 430, and 1330 may be implemented using a processor executing instructions (e.g., firmware) that are stored at the non-volatile memories 104, 404, and 1304. Alternatively, or in addition, executable instructions that are executed by the processor may be stored at a separate memory location that is not part of the non-volatile memories 104, 404, and 1304, such as at a read-only memory (ROM) that may be included in the controllers 130, 430, and 1330.

The data storage devices 102, 402, and 1302 may be coupled to, attached to, or embedded within one or more accessing devices, such as within a housing of the device 180. For example, the data storage devices 102, 402, and 1302 may be embedded within the devices 180, 480, and 1380 in accordance with a Joint Electron Devices Engineering Council (JEDEC) Solid State Technology Association Universal Flash Storage (UFS) configuration. To further illustrate, the data storage devices 102, 402, and 1302 may be integrated within an electronic device (e.g., the device 180 or the device 480), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage devices 102, 402, and 1302 may be implemented in a portable device configured to be selectively coupled to one or more external devices, such as a host device. For example, the data storage devices 102, 402, and 1302 may be removable from the devices 180, 480, and 1380 (i.e., "removably" coupled to the devices 180, 480, and 1380). As an example, the data storage devices 102, 402, and 1302 may be removably coupled to the devices 180, 480, and 1380 in accordance with a removable universal serial bus (USB) configuration.

The devices 180, 480, and 1380 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The devices 180, 480, and 1380 may communicate via a controller, which may enable the devices 180, 480, and 1380 to communicate with the data storage devices 102, 402, and 1302. The devices 180, 480, and 1380 may operate in compliance with a JEDEC Solid State Technology Association industry specification, such as an embedded MultiMedia Card (eMMC) specification or a Universal Flash Storage (UFS) Host Controller Interface specification. The devices 180, 480, and 1380 may operate in compliance with one or more other specifications, such as a Secure Digital (SD) Host Controller specification as an illustrative example. Alternatively, the devices 180, 480, and 1380 may communicate with the data storage devices 102, 402, and 1302 in accordance with another communication protocol. In some implementations, the data storage devices 102, 402, and 1302 may be integrated within a network-accessible data storage system, such as an enterprise data system, an NAS system, or a cloud data storage system, as illustrative examples.

In some implementations, one or both of the data storage devices 102, 402, and 1302 may include a solid state drive (SSD). One or both of the data storage devices 102, 402, and 1302 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, one or both of the data storage devices 102, 402, and 1302 may be coupled to the devices 180, 480, and 1380 via a network. For example, the network may include a data center storage system network, an enterprise storage system network, a storage area network, a cloud storage network, a local area network (LAN), a wide area network (WAN), the Internet, and/or another network.

To further illustrate, one or both of the data storage devices 102, 402, and 1302 may be configured to be coupled to the devices 180, 480, and 1380 as embedded memory, such as in connection with an embedded MultiMedia Card (eMMC®) (trademark of JEDEC Solid State Technology Association, Arlington, Va.) configuration, as an illustrative example. One or both of the data storage devices 102, 402, and 1302 may correspond to an eMMC device. As another example, one or both of the data storage devices 102, 402, and 1302 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). One or both of the data storage devices 102, 402, and 1302 may operate in compliance with a JEDEC industry specification. For example, the data storage devices 102, 402, and 1302 may operate in compliance with a JEDEC eMMC specification, a JEDEC Universal Flash Storage (UFS) specification, one or more other specifications, or a combination thereof.

The non-volatile memories 104, 404, and 1304 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The non-volatile memories 104, 404, and 1304 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where they direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
    a non-volatile memory configured to store data to one or more memory dies using at least one operation of a write process; and
    a controller coupled to the non-volatile memory, the controller including a volatile memory, wherein the controller is configured to perform two distinct separate non-blocking control sync operations and non-blocking consolidation operations, wherein at least one operation of the write process is performed during the non-blocking consolidation operation without delaying the write process until completion of the non-blocking consolidation operation, wherein the non-blocking consolidation operations are atomic operations.

2. The apparatus of claim 1, wherein the non-blocking consolidation operations include merging address translation modification data into a cached portion of an address translation table at the volatile memory without blocking write operations to the non-volatile memory.

3. The apparatus of claim 1, wherein the non-blocking control sync operations include copying control information from the volatile memory to the non-volatile memory without blocking write operations to the non-volatile memory.

4. The apparatus of claim 1, wherein the controller is further configured to perform the non-blocking consolidation operations asynchronously with a different rate with respect to the non-blocking control sync operations as required by an update layer fill state.

5. The apparatus of claim 1, wherein the controller is further configured to continue performing host write operations to the non-volatile memory concurrently with the non-blocking consolidation operations and non-blocking control sync operations.

6. The apparatus of claim 1, wherein the controller is further configured, in case of an ungraceful shutdown (UGSD) event, to rollback and recover control tables to the volatile memory according to a last stored log from a last stored non-blocking control sync in the non-volatile memory and in such case recent updates that were already performed in the U-Layer and CAT by the controller are lost and ignored without loss of coherency.

7. An apparatus comprising:
    a non-volatile memory; and
    a controller coupled to the non-volatile memory, the controller including a volatile memory, wherein the controller is configured to perform separate non-blocking control sync operations and non-blocking consolidation operations, wherein the non-blocking consolidation operations are atomic operations that include concurrent evacuation and compaction of an update layer (U-Layer) to a cached address translation table (CAT) in the volatile memory.

8. The apparatus of claim 7, wherein the controller is further configured to continue performing updates to the U-Layer and the CAT in the volatile memory while updated m-sets are written to the non-volatile memory.

9. An apparatus comprising:
    a non-volatile memory; and
    a controller coupled to the non-volatile memory, the controller including a volatile memory, wherein the controller is configured to perform separate non-blocking control sync operations and non-blocking consolidation operations, wherein the controller is further configured to update a log that includes pointers to new updated m-sets and store the log in the non-volatile memory in a next non-blocking control sync operation using a barrier command.

10. An apparatus comprising:
a non-volatile memory; and
a controller coupled to the non-volatile memory, the controller including:
  an interface configured to receive a first request for access to the non-volatile memory from an access device; and
  a volatile memory configured to store a first copy of a control structure associated with the non-volatile memory,
wherein the controller is further configured to perform a first update of a portion of the first copy of the control structure in response to the first request, to initiate a second update of a second copy of the control structure at the non-volatile memory based on the first update, and to execute a second request for access to the non-volatile memory concurrently with the second update, wherein the second update is included in an atomic consolidation operation to merge modifications associated with the first copy at the volatile memory with the second copy.

11. The apparatus of claim 10, wherein the control structure includes a control table, and wherein the portion of the first copy of the control structure indicates logical-to-physical (L2P) address translations prior to modification of the second copy of the control structure to indicate the L2P address translations.

12. The apparatus of claim 10, wherein the portion comprises an update data structure having multiple lists of address modifications, each of the multiple lists corresponding to a distinct set of logical block addresses (LBAs).

13. A method comprising:
receiving, by a first device, a first request from a second device to perform a first write operation to a non-volatile memory of the first device;
in response to performing the first write operation, performing a first update of a portion of a first copy of a control table stored at a volatile memory of the first device;
performing a second update of a second copy of the control table at the non-volatile memory to propagate modifications of the first copy to the second copy; and
during performance of the second update, performing a second write operation to the non-volatile memory, wherein the second update is included in an atomic consolidation operation to merge modifications associated with the first copy at the volatile memory with the second copy.

14. The method of claim 13, wherein the second update is performed in response to detecting that a number of the modifications satisfies a threshold, and further comprising incrementing the number in response to performing the first write operation.

15. The method of claim 13, further comprising performing a control sync operation to copy the control table to the non-volatile memory independently of the second update.

16. The method of claim 13, further comprising updating a pointer within the control table to indicate a location of the updated second copy of the control table in the non-volatile memory, the updated second copy of the control table indicating at least a portion of a logical-to-physical (L2P) mapping table.

17. An apparatus comprising:
means for storing data;
means for receiving a first request for access to the means for storing data from an access device;
means for storing a portion of a first copy of a control table associated with the means for storing data; and
means for performing a first update of the portion of the first copy of the control table in response to the first request, for initiating a second update of a second copy of the control table at the means for storing data based on the first update, and for performing a second request for access to the means for storing data concurrently with the second update, wherein the second update is included in an atomic consolidation operation to merge modifications associated with the first copy at the volatile memory with the second copy.

18. The apparatus of claim 17, wherein the means for storing data is configured for non-volatile data storage, wherein the means for storing the portion of the first copy is configured for volatile data storage, and further comprising means for providing the updated portion of the first copy of the control table to the means for storing data.

19. An apparatus comprising:
a non-volatile memory; and
a controller coupled to the non-volatile memory, the controller including a volatile memory, wherein the controller is configured to perform non-blocking control sync operations, and wherein the controller is further configured to perform non-blocking consolidation operations asynchronously with respect to the non-blocking control sync operations, wherein at least one operation of a write process is performed during the non-blocking consolidation operation without delaying the write process until completion of the non-blocking consolidation operation, wherein the non-blocking consolidation operations are atomic operations.

20. An apparatus comprising:
a non-volatile memory; and
a controller coupled to the non-volatile memory, the controller including a volatile memory, wherein the controller is configured to perform non-blocking control sync operations, and wherein the controller is further configured to perform non-blocking consolidation operations asynchronously with respect to the non-blocking control sync operations, wherein the non-blocking consolidation operations are atomic operations that include concurrent evacuation and compaction of an update layer to a cached address translation table in the volatile memory, and wherein the controller is configured to perform host write operations to the non-volatile memory concurrent to the non-blocking consolidation operations.

* * * * *